(12) United States Patent
Lee et al.

(10) Patent No.: US 11,725,643 B2
(45) Date of Patent: Aug. 15, 2023

(54) PISTON FOR COMPRESSOR AND COMPRESSOR HAVING SAME

(71) Applicant: LG Electronics Inc., Seoul (KR)

(72) Inventors: Kyunyoung Lee, Seoul (KR); Kiwon Noh, Seoul (KR)

(73) Assignee: LG Electronics Inc., Seoul (KR)

( * ) Notice: Subject to any disclaimer, the term of this patent is extended or adjusted under 35 U.S.C. 154(b) by 294 days.

(21) Appl. No.: 17/060,636

(22) Filed: Oct. 1, 2020

(65) Prior Publication Data

US 2021/0095654 A1 Apr. 1, 2021

(30) Foreign Application Priority Data

Oct. 1, 2019 (KR) .......................... 10-2019-0121522

(51) Int. Cl.
*F04B 35/04* (2006.01)
*F04B 39/10* (2006.01)
(Continued)

(52) U.S. Cl.
CPC ........ *F04B 35/045* (2013.01); *F04B 39/0016* (2013.01); *F04B 39/1086* (2013.01); *F04B 17/046* (2013.01); *F04B 53/14* (2013.01)

(58) Field of Classification Search
CPC ............................ F04B 35/045; F04B 39/0016; F04B 39/1086; F04B 17/04; F04B 17/046; F04B 39/0005; F04B 53/14; F04B 39/10
See application file for complete search history.

(56) References Cited

U.S. PATENT DOCUMENTS

| 5,947,708 A | * | 9/1999 | Park | A61P 9/00 |
| | | | | 417/570 |
| 2005/0008512 A1 | * | 1/2005 | McGill | F04B 39/0005 |
| | | | | 417/313 |

(Continued)

FOREIGN PATENT DOCUMENTS

DE 102005038605 3/2006
EP 3346127 7/2018
(Continued)

OTHER PUBLICATIONS

Notice of Allowance in Korean Appln. No. 10-2021-0034575, dated Jan. 20, 2022, 4 pages (with English translation).
(Continued)

*Primary Examiner* — Kenneth J Hansen
*Assistant Examiner* — David N Brandt
(74) *Attorney, Agent, or Firm* — Fish & Richardson P.C

(57) ABSTRACT

A piston for a compressor and a compressor including the same are disclosed. The piston is used in a compressor which compresses and discharges refrigerant suctioned into a cylinder. The piston includes a cylindrical slider and a head. The slider has an outer diameter corresponding to an inner diameter of the cylinder and defines a suction space in which the refrigerant suctioned in the cylinder is received. The head is coupled to the slider, in which a compression space is provided in the front and a suction space is provided in the rear, and in which a suction port communicating with the suction space and the compression space is formed, in which the head includes an inner body and an outer body surrounding the inner body, and the suction port is formed between the inner body and the outer body.

18 Claims, 22 Drawing Sheets

(51) Int. Cl.
    *F04B 39/00*     (2006.01)
    *F04B 17/04*     (2006.01)
    *F04B 53/14*     (2006.01)

(56) References Cited

U.S. PATENT DOCUMENTS

2010/0183463 A1*   7/2010  Lilie ................ F04B 39/14
                                                      417/545
2015/0377227 A1*  12/2015  Muhle .............. F04B 39/0005
                                                      417/545

FOREIGN PATENT DOCUMENTS

| KR | 1020060033586 | 4/2006 |
| KR | 20070076582 | 7/2007 |
| KR | 101457664 | 11/2014 |
| KR | 20150117665 | 10/2015 |
| KR | 1020160000651 | 1/2016 |
| KR | 101990140 | 6/2019 |
| WO | WO2009003260 | 1/2009 |

OTHER PUBLICATIONS

Extended European Search Report in EP Appln. No. 20198683.3, dated Dec. 10, 2020, 4 pages.
KR Notice of Allowance in Korean Appln. No. 10-2019-0121522, dated Dec. 16, 2020, 4 pages (with English translation).

* cited by examiner (a)

(b)

(a)          (b)

(a)　　　　　　　(b)

PISTON FOR COMPRESSOR AND COMPRESSOR HAVING SAME

CROSS-REFERENCE TO RELATED APPLICATION

This application is based on and claims the benefit of priority to Korean Patent Application No. 10-2019-0121522, filed on Oct. 1, 2019, in the Korean Intellectual Property Office, the disclosure of which is incorporated herein in its entirety by reference.

TECHNICAL FIELD

The present disclosure relates to a piston for a compressor and a compressor including the same. More specifically, the present disclosure relates to a piston for a linear compressor that compresses a refrigerant by a linear reciprocating motion of the piston and a compressor including the same.

BACKGROUND

In general, a compressor refers to a device configured to compress a working fluid such as air or refrigerant by receiving power from a power generating device such as a motor or a turbine. Compressors are widely applied to the whole industry or home appliances, in particular, a steam compression refrigeration cycle (hereinafter referred to as a 'refrigeration cycle').

These compressors may be classified into a reciprocating compressor, a rotary compressor, and a scroll compressor according to a method of compressing refrigerant.

The reciprocating compressor is a compressor operated by a method in which a compression space is formed between the piston and the cylinder and the piston linearly reciprocates to compress a fluid, the rotary compressor is a compressor operated by a method in which fluid is compressed by a roller eccentrically rotated inside the cylinder, and the scroll compressor is a compressor operated by a method of interlocking and rotating a pair of spiral scrolls to compress a fluid.

Recently, among the reciprocating compressors, the use of a linear compressor using a linear reciprocating motion without a crankshaft has gradually increased. The linear compressor has the advantage of improving the efficiency of the compressor because there is little mechanical loss associated with converting rotational motion to linear reciprocating motion and having a relatively simple structure.

In the linear compressor, a cylinder is located inside a casing forming an enclosed space to form a compression chamber, and a piston covering the compression chamber is configured to reciprocate inside the cylinder. In a linear compressor, a process in which fluid in the enclosed space is suctioned into the compression chamber while the piston is located at the bottom dead center (BDC) and the fluid in the compression chamber is compressed and discharged while the piston is located at the top dead center (TDC) is repeated.

A compression unit and a driving unit are respectively installed inside the linear compressor, and the compression unit performs a process of compressing and discharging the refrigerant while performing a resonance motion by a resonance spring through the movement generated by the driving unit.

The linear compressor repeatedly performs a series of processes in which the refrigerant is discharged from the compression space by the forward motion of the piston and is moved to the condenser through the discharge pipe after the refrigerant is suctioned in the casing through the suction pipe while the piston reciprocates at high speed inside a cylinder by a resonance spring.

Referring to FIG. 1, in Korean Patent Publication No. 10-1990140, a technique that a suction port 11 for flowing a refrigerant into a compression space is formed at the front surface part of the piston 10, and a suction valve 20 for opening and closing the suction port 11 is provided in front of the suction port 11 is disclosed.

A plurality of suction ports 11 are formed to be spaced apart from the center C of a coupling hole 12 by a predetermined length in the radial direction.

The suction valve 20 is fastened to the piston 10 by the valve coupling member 30 and includes a fixing part 21 to which the valve coupling member 30 is coupled and a plurality of opening parts 22 which extend in the outside direction of the fixing parts 21. At this time, the plurality of opening parts 22 are bent forward to open the suction port 11 and return to the rear to close the suction port 11.

However, as the compressor is gradually miniaturized, the diameter of the piston 10 tends to decrease, and when the diameter of the piston 10 decreases, the inner diameter of the suction port 11 also inevitably decreases. In addition, as the length of the opening part 22 of the suction valve 20 is shortened, the stiffness of the suction valve 20 also increases, so that the response characteristics of the suction valve 20 deteriorate.

As described above, in the conventional compressor, as the piston 10 is miniaturized, the cross-sectional area of the plurality of suction ports 11 decreases, thereby reducing the discharge flow rate, and the stiffness of the suction valve 20 increases, resulting in poor response characteristics, and thus there is a problem that the overall compression efficiency is lowered.

PRIOR ART

Patent Document 1
Korean Patent Publication 10-1990140B (published on Jun. 18, 2019)

SUMMARY

An object of the present disclosure is to provide a piston for a compressor which is capable of improving compression efficiency by increasing the effective cross-sectional area of the suction port through a change in the shape of the suction port while reducing the cross-sectional area of the piston, and a compressor including the same.

In addition, an object of the present disclosure is to provide a piston for a compressor which is capable of improving the durability of the suction valve while preventing leakage of refrigerant when the suction valve is closed, and a compressor including the same.

In addition, an object of the present disclosure is to provide a piston for a compressor which is capable of reducing flow path resistance and consequently improving compression efficiency by changing a shape of a suction port or changing a shape of a bridge, and a compressor including the same.

Particular implementations of the present disclosure provide a piston for a compressor. The compressor can include a cylinder and be configured to compress and discharge a refrigerant in the cylinder. The piston can include a cylindrical slider and a head. The cylindrical slider can be received in the cylinder and define a suction space configured to receive the refrigerant that is suctioned into the cylinder. The head can be coupled to the slider and have a first side and a second side opposite to the first side. A compression space is defined at the first side of the head and a suction space is defined at the second side of the head. The head can define a suction port that fluidly communicates with the suction space and the compression space. The head can include an inner body and an outer body surrounding the inner body. The suction port can be defined between the inner body and the outer body.

In some implementations, the piston can optionally include one or more of the following features. The head can include a plurality of bridges that connect the inner body to the outer body and that are spaced apart from each other in a circumferential direction with respect to a center of the inner body. The suction port can be spaced apart from an inner circumferential surface of the slider. The piston can include a suction valve that is coupled to the first side of the head and that is configured to open and close the suction port. Based on the suction valve being seated at the first side of the head, the suction valve can extend radially and have an outer periphery that is positioned between (i) a first surface that includes an outer circumferential surface of the outer body and (ii) a second surface that includes an inner circumferential surface of the outer body. The outer body of the head can include an insert part and a cover part. The insert part can be inserted into the slider. The cover part can extend radially from the insert part and face an end of the slider. The cover part can be seated at the end of the slider. An outer diameter of the cover part can be the same as an outer diameter of the slider, or be smaller than the outer diameter of the slider and greater than an inner diameter of the slider. The piston can include a suction valve that is coupled to the first side of the head and configured to open and close the suction port. Based on the suction valve being seated at the front side of the head, an outer diameter of the suction valve can be smaller than the outer diameter of the cover part and is larger than the inner diameter of the slider. An outer circumferential surface of the inner body of the head can include a first inclined surface or a first curved surface that decreases an outer diameter of the inner body in a direction toward the suction space. The outer circumferential surface of the inner body of the head can include a first outer circumferential surface that has a consistent diameter in an axial direction, and a second outer circumferential surface that extends from the first outer circumferential surface. The second outer circumferential surface can have a diameter that decreases toward the second side of the head. The second outer circumferential surface can include the first inclined surface or the first curved surface. The first outer circumferential surface can be located closer to the compression space than the suction space. The second outer circumferential surface can be located closer to the suction space than the compression space. The head can include a bridge that connects the inner body to the outer body. The bridge can extend from the first inclined surface or the first curved surface. An inner circumferential surface of the outer body of the head can include a second inclined surface or a second curved surface that increases an inner diameter of the outer body in the direction toward the suction space. An outer circumferential surface of the inner body of the head can include an outer diameter of the inner body that decreases in a direction toward the suction space. The outer circumferential surface of the inner body of the head can include a curved surface that has a radius of curvature that decreases toward the suction space. A fine groove can be defined at at least one of an inner circumferential surface of the inner body of the head or an outer circumferential surface of the outer body of the head. The fine groove can include a shape of a partial concave sphere. The fine groove can include a slit shape that extends in a flow direction of the refrigerant. The head can include a bridge that connects the inner body to the outer body. A side surface of the bridge can include a convex surface in a direction toward the suction port. The side surface of the bridge can include a curved surface that has a radius of curvature that increases in a flow direction of the refrigerant. The head can include a bridge that connects the inner body to the outer body and that has opposite side surfaces that extend toward a center of the inner body. The piston can include a suction valve that is coupled to the first side of the head and that is configured to open and close the suction port. The suction valve can include a fixing part that is fixed to the inner body of the head, a plurality of wing parts that surround the fixing part and that are configured to flex based on flowing of the refrigerant that is discharged from the suction port, and a plurality of cutting parts that extend in a radial direction from an outer circumferential edge of the plurality of wing parts. The plurality of cutting parts can overlap with the plurality of bridges, respectively. The suction port can be defined at opposite sides of each of the plurality of bridges, and be closed by the wing parts based on the suction valve closing the suction port.

Particular implementations of the present disclosure provide a compressor that includes a cylinder, a piston, and a discharge valve. The piston can include a cylindrical slider and a head. The cylindrical slider can be received in the cylinder and define a suction space configured to receive a refrigerant that is suctioned in the cylinder. The head can be coupled to the slider and have a first side and a second side opposite to the first side. A compression space can be defined at the first side of the head and a suction space is defined at the second side of the head. The head can define a suction port that fluidly communicates with the suction space and the compression space. The head can include an inner body and an outer body surrounding the inner body. The suction port can be defined between the inner body and the outer body. The discharge valve can be configured to selectively open and close an opening of the cylinder.

A piston for a compressor according to an embodiment of the present disclosure that is used in a compressor which compresses and discharges refrigerant suctioned into a cylinder, the piston may include a cylindrical slider having an outer diameter corresponding to an inner diameter of the cylinder and forming a suction space in which the refrigerant suctioned in the cylinder is received, and a head which configured to be coupled to the slider, in which a compression space is provided in the front and a suction space is provided in the rear, and in which a suction port communicating with the suction space and the compression space is formed, in which the head may include an inner body and an outer body surrounding the inner body, and the suction port may be formed between the inner body and the outer body.

In addition, the head may further include a plurality of bridges which connect the inner body and the outer body and are disposed in a circumferential direction with respect to the center of the inner body.

In addition, the suction port may be located to be spaced apart from an inner circumferential surface of the slider.

At this time, the piston may further include a suction valve configured to be coupled to the front of the head and to be capable of opening and closing the suction port, in which when the suction valve is seated at a front end part of the head, an outer circumferential edge of the suction valve may be disposed inside an outer circumferential surface of the outer body in a radial direction and disposed outside an inner circumferential surface of the outer body in the radial direction.

In addition, the outer body may include an insert part inserted into the slider, and a cover part located in front of the insert part, extending outward from the insert part in the radial direction, and facing a front end part of the slider.

Here, the cover part may be seated before the slider, and an outer diameter of the cover part may be the same as an outer diameter of the slider, or an outer circumferential surface of the cover part may be provided to be located between an outer circumferential surface and the inner circumferential surface of the slider.

At this time, the piston may further include a suction valve configured to be coupled to the front of the head and to be capable of opening and closing the suction port, in which when the suction valve is seated at the front surface of the head, an outer diameter of the suction valve may be smaller than the outer diameter of the cover part and may be larger than the inner diameter of the slider.

In addition, an outer circumferential surface of the inner body may include an inclined surface or a curved surface so that an outer diameter of the inner body is reduced in a direction toward the suction space.

Here, the outer circumferential surface of the inner body may include a first outer circumferential surface which has the same diameter, and a second outer circumferential surface which is located at the rear of the first outer circumferential surface, has a diameter which decreases toward the rear, and has the inclined surface or a curved surface.

Alternatively, the head may further include a bridge connecting the inner body and the outer body, and a front end part of the bridge may extend from the inclined surface or the curved surface.

Alternatively, an inner circumferential surface of the outer body may include an inclined surface or a curved surface so that an inner diameter of the outer body increases in a direction toward the suction space.

In addition, an outer circumferential surface of the inner body may be provided so that an outer diameter of the inner body decreases in a direction toward the suction space and include a curved surface which has the radius of curvature which decreases toward the suction space.

In addition, a fine groove may be formed on at least one of an inner circumferential surface of the inner body and an outer circumferential surface of the outer body.

At this time, the fine groove may be provided in a partial shape of a concave sphere.

Alternatively, the fine groove may be provided in a slit shape extending in a flow direction of the refrigerant.

In addition, the head may further include a bridge connecting the inner body and the outer body, and a side surface of the bridge may include a convex curved surface in a direction toward the suction port.

In addition, the head may further include a bridge connecting the inner body and the outer body, and the side surface of the bridge may include a curved surface which has the radius of curvature increasing in the flow direction of the refrigerant.

In addition, the head may further include a bridge which connects the inner body and the outer body and has both side surfaces extending in a direction connecting the center of the inner body.

In addition, the piston may further include a suction valve configured to be coupled to the front of the head and to be capable of opening and closing the suction port, in which the suction valve may include a fixing part fixed to the inner body, a plurality of wing parts surrounding the fixing part and reversibly deformed forward by the flowing of the refrigerant discharged from the suction port, and a plurality of cutting parts which are recessed in the radial direction from an outer circumferential edge of the wing part, and the plurality of cutting parts may be respectively disposed in front of the bridge, and the suction ports formed on both sides of the bridge may be closed by the wing parts in a state where the suction valve closes the suction ports.

According to another aspect of the present disclosure, a compressor including the piston described above, a cylinder surrounding the piston, and a discharge valve configured to selectively open and close a front opening of the cylinder may be provided.

DETAILED DESCRIPTION

Figure 1:
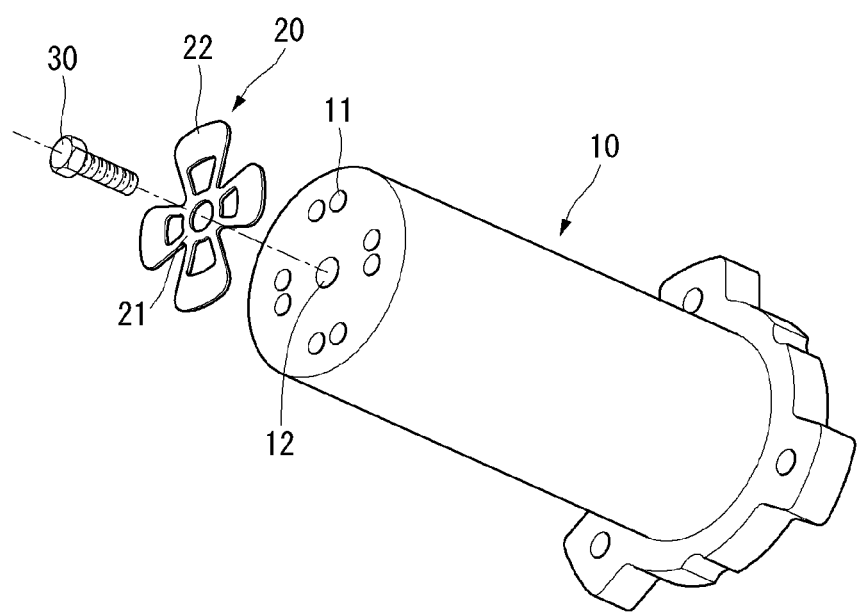
FIG. 1 is a perspective view illustrating a piston of a conventional compressor.

Hereinafter, embodiments disclosed in the present specification will be described in detail with reference to the accompanying drawings, but identical or similar components are denoted by the same reference numerals regardless of reference numerals, and redundant descriptions thereof will be omitted.

In describing embodiments disclosed in the present specification, when a component is referred to as being "connected" or "linked" to another component, a component may be directly connected or linked to another component, but it should be understood that other components may exist therebetween.

In addition, in describing embodiments disclosed in the present specification, when it is determined that detailed descriptions of related known technologies may obscure the subject matter of embodiments disclosed in the present specification, detailed descriptions thereof will be omitted. In addition, It should be understood that the accompanying drawings are only for easy understanding of embodiments disclosed in the present specification, and the technical idea disclosed in the present specification is not limited by the accompanying drawings, and include all modifications, equivalents to substitutes included in the spirit and the technical scope of the present disclosure.

Figure 2:
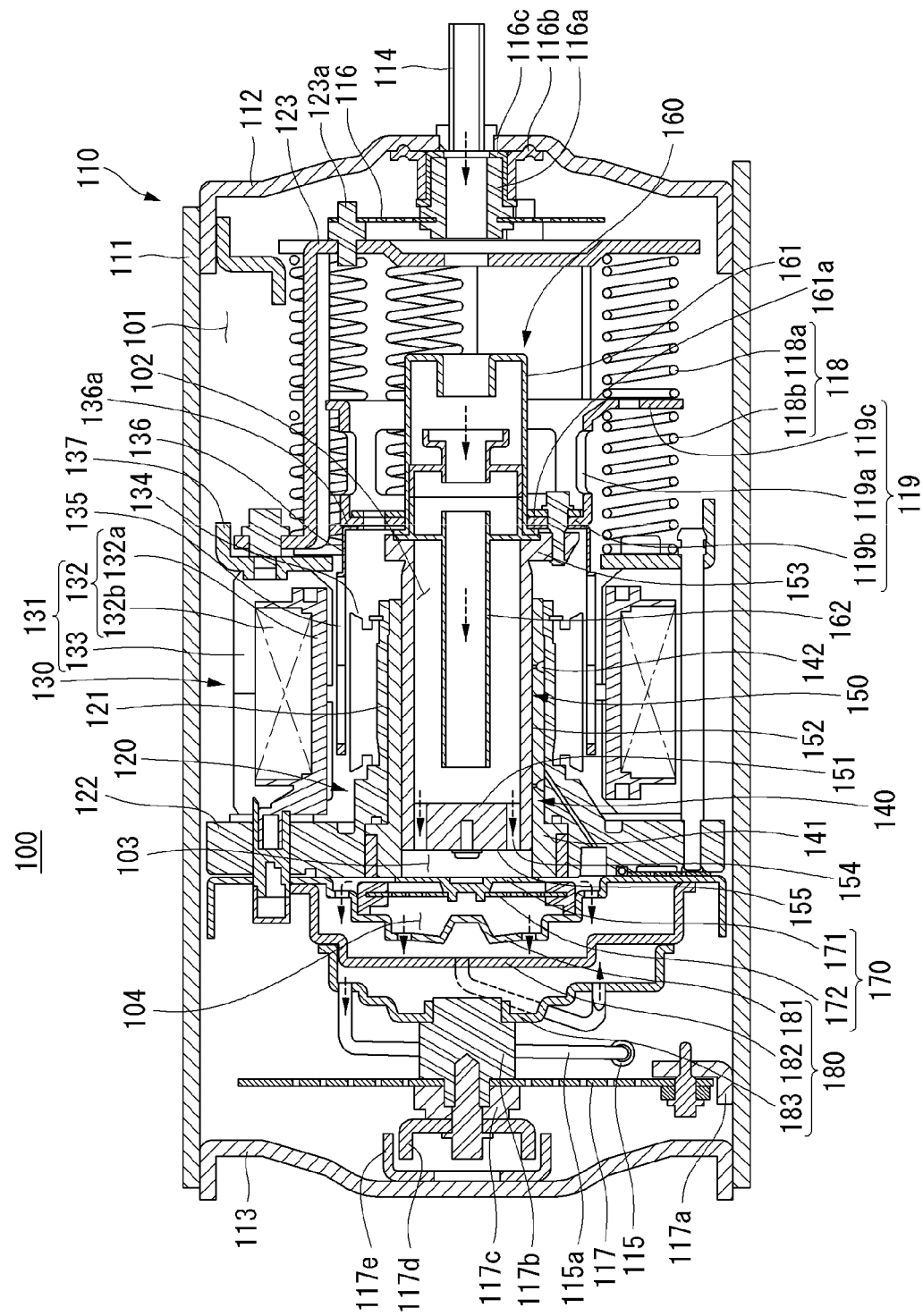
FIG. 2 is a cross-sectional view for explaining the structure of the compressor.

FIG. 2 is a cross-sectional view for explaining the structure of the compressor 100.

Hereinafter, the compressor according to the present disclosure will be described, as an example, a linear compressor that suctions and compresses a fluid and, discharges the compressed fluid while a piston performs a linear reciprocating motion.

The linear compressor may be a component of a refrigeration cycle, and the fluid compressed in the linear compressor may be a refrigerant circulating in the refrigeration cycle. In addition to the compressor, the refrigeration cycle includes a condenser, an expansion device, and an evaporator. In addition, the linear compressor may be used as a component of a cooling system of a refrigerator, but is not limited thereto, and may be widely used throughout the industry.

Referring to FIG. 2, the compressor 100 may include a casing 110 and a main body received in the casing 110.

The main body includes a frame 120, a cylinder 140 fixed to the frame 120, a piston 150 for linearly reciprocating the inside of the cylinder 140, a driving unit 130 which is fixed to the frame 120 and imparts a driving force to the piston 150, and the like. Here, the cylinder 140 and the piston 150 may be referred to as compression units 140 and 150.

The compressor 100 may be provided with a bearing means for reducing friction between the cylinder 140 and the piston 150. The bearing means may be oil bearings or gas bearings. Alternatively, a mechanical bearing may be used as a bearing means.

Both end parts of the main body of the compressor 100 may be elastically supported by support springs 116 and 117 installed inside the casing 110. The support spring includes a first support spring 116 for supporting the rear of the main body and a second support spring 117 for supporting the front of the main body and may be provided as a leaf spring. The support springs 116 and 117 may absorb vibrations and shocks generated by the reciprocating motion of the piston 150 while supporting the internal components of the main body.

The casing 110 may form an enclosed space, and the enclosed space includes a receiving space 101 in which the suctioned refrigerant is received, a suction space 102 filled with the refrigerant before being compressed, and a compression space 103 for compressing the refrigerant, and a discharge space 104 filled with the compressed refrigerant.

In other words, the refrigerant suctioned from the suction pipe 114 connected to the rear side of the casing 110 is filled in the receiving space 101, and the refrigerant in the suction space 102 communicating with the receiving space 101 is compressed in the compression space 103, discharged to the discharge space 104, and discharged to the outside through a discharge pipe 115 connected to the front side of the casing 110.

The casing 110 has a shell 111 formed in an elongated cylindrical shape in a substantially transverse direction with both ends opened, a first shell cover 112 coupled to the rear side of the shell 111, and a second shell cover 113 coupled to the front side.

Here, the front side denotes a direction in which the compressed refrigerant is discharged to the left side of the drawing, and the rear side denotes a direction in which the refrigerant flows to the right side of the drawing. In addition, the first shell cover 112 or the second shell cover 113 may be formed integrally with the shell 111.

The casing 110 may be formed of a thermally conductive material. Through this, the heat generated in the inner space of the casing 110 may be quickly radiated to the outside.

The first shell cover 112 is coupled to the shell 111 to seal the rear side of the shell 111, and a suction pipe 114 is inserted in the center of the first shell cover 112 to be coupled.

The rear side of the main body of the compressor 100 may be elastically supported in the axial direction to the first shell cover 112 through the first support spring 116.

The first support spring 116 may be provided as a circular leaf spring, an edge part thereof may be supported by a back cover 123 in the front direction through a support bracket 123a, and an opened central part thereof may be supported by the first shell cover 112 in the rear direction through the suction guide 116a.

The suction guide 116a is formed in a cylindrical shape in which a through-flow path is provided. The suction guide 116a may have a central opening part of the first support spring 116 coupled to the front outer circumferential surface, and the rear end part thereof may be supported by the first shell cover 112. In this case, a separate suction-side support member 116b may be interposed between the suction guide 116a and the inner surface of the first shell cover 112.

The rear side of the suction guide 116a may communicate with the suction pipe 114, and the refrigerant suctioned through the suction pipe 114 may pass through the suction guide 116a and may smoothly flow into the muffler unit 160, which will be described later.

A damping member 116c made of a rubber material or the like may be installed between the suction guide 116a and the suction-side support member 116b. Accordingly, it is possible to block the transmission of vibrations that may occur while the refrigerant is suctioned through the suction pipe 114 to the first shell cover 112.

The second shell cover 113 may be coupled to the shell 111 to seal the front side of the shell 111, and the discharge pipe 115 may be inserted and coupled through a loop pipe 115a. The refrigerant discharged from the compression space 103 may pass through a discharge cover assembly 180 and then be discharged to the refrigeration cycle through the loop pipe 115a and the discharge pipe 115.

The front side of the compressor main body may be elastically supported in the radial direction to the shell 111 or the second shell cover 113 through the second support spring 117.

The second support spring 117 may be provided as a circular leaf spring, and the opened central part thereof is supported by the discharge cover assembly 180 in the rear direction through a first support guide 117b, and the edge part thereof may be supported on the inner surface of the shell 111 or the inner circumferential surface of the shell 111 adjacent to the second shell cover 113 in the radial direction. Alternatively, unlike the drawings, the edge part of the second support spring 117 may be supported by the second shell cover 113 in the front direction through a bracket (not illustrated).

The first support guide 117b is formed in a continuous cylindrical shape with different diameters, the front side thereof may be inserted into the central opening of the second support spring 117, and the rear side thereof is inserted into the central opening of the discharge cover assembly 180. In addition, the support cover 117c may be coupled to the front side of the first support guide 117b with the second support spring 117 interposed therebetween.

A cup-shaped second support guide 117d which is recessed forward is coupled to the front side of the support cover 117c, and a cup-shaped third support guide 117e which corresponds to the second support guide 117d and is recessed backward may be coupled to the inside of the second shell cover 113. The second support guide 117d may be inserted into the third support guide 117e to be supported in an axial direction and a radial direction. In this case, a gap may be formed between the second support guide 117d and the third support guide 117e.

The frame 120 includes a body part 121 supporting an outer circumferential surface of the cylinder 140 and a flange part 122 connected to one side of the body part 121 and supporting the driving unit 130. The frame 120 may be elastically supported by the casing 110 by the first support spring 116 and the second support spring 117 together with the driving unit 130 and the cylinder 140.

The body part 121 may be formed in a cylindrical shape surrounding the outer circumferential surface of the cylinder 140, and the flange part 122 may be formed to extend in a radial direction from the front end part of the body part 121.

The cylinder 140 may be coupled to the inner circumferential surface of the body part 121, and an inner stator 134 may be coupled to the outer circumferential surface thereof. For example, the cylinder 140 may be fixed by press-fitting to the inner circumferential surface of the body part 121 and the inner stator 134 may be fixed using a fixing ring.

An outer stator 131 may be coupled to the rear surface of the flange part 122, and the discharge cover assembly 180 may be coupled to the front surface thereof. For example, the outer stator 131 and the discharge cover assembly 180 may be fixed through a mechanical coupling means.

A bearing inlet groove 125a forming a part of the gas bearing is formed on one side of the front surface of the flange part 122, a bearing communication hole 125b penetrating from the bearing inlet groove 125a to the inner circumferential surface of the body part 121 is formed, and the gas groove 125c communicated with the bearing communication hole 125b may be formed on the inner circumferential surface of the body part 121.

The bearing inlet groove 125a is formed by being recessed in the axial direction to a predetermined depth, and the bearing communication hole 125b is a hole having a smaller cross-sectional area than the bearing inlet groove 125a and may be formed to be inclined toward the inner circumferential surface of the body part 121. The gas groove 125c may be formed in an annular shape having a predetermined depth and an axial length on the inner circumferential surface of the body part 121. Alternatively, the gas groove 125c may be formed on the outer circumferential surface of the cylinder 140 where the inner circumferential surface of the body part 121 contacts or may be formed on both the inner circumferential surface of the body part 121 and the outer circumferential surface of the cylinder 140.

Further, a gas inflow port 142 corresponding to the gas groove 125c may be formed on the outer circumferential surface of the cylinder 140. The gas inflow port 142 forms a kind of nozzle part in the gas bearing.

Meanwhile, the frame 120 and the cylinder 140 may be made of aluminum or aluminum alloy.

The cylinder 140 may be formed in a cylindrical shape with both end parts open.

In the cylinder 140, the piston 150 is inserted through the rear end part of the cylinder 140, and the front end part thereof may be closed through a discharge valve assembly 144.

A compression space 103 surrounded by the cylinder 140, a front end part (head 151) of the piston 150, and the discharge valve assembly 144 may be formed. The volume of the compression space 103 increases when the piston 150 moves backward and the volume of the compression space 103 decreases as the piston 150 moves forward. In other words, the refrigerant flowing into the compression space 103 is compressed while the piston 150 moves forward and may be discharged through a discharge valve assembly 170.

The cylinder 140 may have a front end part bent outward to form a flange part 141. The flange part 141 of the cylinder 140 may be coupled to the frame 120. For example, a flange groove corresponding to the flange part 141 of the cylinder 140 may be formed at the front end part of the frame 120, and the flange part 141 of the cylinder 140 may be inserted into the flange groove and may be coupled through a mechanical coupling member.

Meanwhile, a gas bearing means capable of lubricating gas between the cylinder 140 and the piston 150 by supplying discharge gas at an interval between the outer circumferential surface of the piston 150 and the outer circumferential surface of the cylinder 140 may be provided. The discharge gas between the cylinder 140 and the piston 150 provides a levitation force to the piston 150 to reduce the friction of the piston 150 against the cylinder 140.

For example, a gas inflow port 142 which communicates with the gas groove 125c formed on the inner circumferential surface of the body part 121 and guides the compressed refrigerant passing through the cylinder 140 in the radial direction and flowing into the gas groove 125c between the inner circumferential surface of the cylinder 140 and the outer circumferential surface of the piston 150 may be formed in the cylinder 140. Alternatively, in consideration of the convenience of processing, the gas groove 125c may be formed on the outer circumferential surface of the cylinder 140.

The inlet of the gas inflow port 142 may be relatively wide, and the outlet thereof may be formed as a fine through-hole to serve as a nozzle. A filter (not illustrated) may be additionally provided at the inlet of the gas inflow port 142 to block the inflow of foreign substances. The filter may be a mesh filter made of metal or may be formed by winding a member such as a fine thread.

A plurality of gas inflow ports 142 may be independently formed, or an inlet may be formed as an annular groove and a plurality of outlets may be formed along the annular groove at a predetermined interval.

In addition, the gas inflow port 142 may be formed only on the front side with respect to the middle of the cylinder 140 in the axial direction or may be also formed at the rear side together at the front side in consideration of the sagging of the piston 150.

The piston 150 is inserted into the rear opening of the cylinder 140 and is provided to seal the rear of the compression space 103.

The piston 150 includes a head 151 which has a disk shape to divide the compression space 103 and a cylindrical guide 152 extending rearward from the outer circumferential surface of the head 151.

The head 151 may be provided to be partially opened, and the guide 152 may be provided to have a hollow shape. The front of the guide 152 is partially sealed by the head 151, but the rear thereof is opened to be connected to the muffler unit 160. The head 151 may be provided as a separate member coupled to the guide 152, or the head 151 and the guide 152 may be integrally formed.

A suction port 154 is formed through the head 151 of the piston 150. The suction port 154 is provided to communicate the suction space 102 and the compression space 103 inside the piston 150. For example, the refrigerant flowing from the receiving space 101 to the suction space 102 inside the piston 150 may pass through the suction port 154 and be suctioned to the compression space 103 between the piston 150 and the cylinder 140.

The suction port 154 may extend in the axial direction of the piston 150. Alternatively, the suction port 154 may be formed to be inclined in the axial direction of the piston 150. For example, the suction port 154 may extend so as to incline in a direction away from the central axis toward the rear of the piston 150.

The suction port 154 may have a circular opening and a constant inner diameter. Alternatively, the suction port 154 may be formed as a long hole in which the opening extends in the radial direction of the head 151 or may be formed such that the inner diameter thereof increases toward the rear.

A plurality of suction ports 154 may be formed in one or more of a radial direction and a circumferential direction of the head 151.

In addition, a suction valve 155 for selectively opening and closing the suction port 154 may be mounted on the head 151 of the piston 150 adjacent to the compression space 103. The suction valve 155 may be operated by elastic deformation to open or close the suction port 154. In other words, the suction valve 155 may be elastically deformed to open the suction port 154 by the pressure of the refrigerant flowing into the compression space 103 through the suction port 154.

Further, the piston 150 is connected to a mover 135, and the mover 135 reciprocates in the front and rear direction according to the movement of the piston 150. The inner stator 134 and the cylinder 140 may be located between the mover 135 and the piston 150. Further, the mover 135 and the piston 150 may be connected by a magnet frame 136 formed by bypassing the cylinder 140 and the inner stator 134 to the rear.

The muffler unit 160 is coupled to the rear of the piston 150 and is provided to attenuate noise generated during the process in which the refrigerant is suctioned to the piston 150. The refrigerant suctioned through the suction pipe 114 flows through the muffler unit 160 to the suction space 102 inside the piston 150.

The muffler unit 160 includes a suction muffler 161 communicating with the receiving space 101 of the casing 110, and an inner guide 162 connected to the front of the suction muffler 161 and guiding the refrigerant to the suction port 154.

The suction muffler 161 is located at the rear of the piston 150, the rear opening is disposed adjacent to the suction pipe 114, and the front end part may be coupled to the rear of the piston 150. The suction muffler 161 has a flow path formed in the axial direction to guide the refrigerant in the receiving space 101 to the suction space 102 inside the piston 150.

In this case, a plurality of noise spaces divided by baffles may be formed inside the suction muffler 161. The suction muffler 161 may be formed by coupling two or more members to each other, and for example, a second suction muffler may be press-fitted inside the first suction muffler to form a plurality of noise spaces. In addition, the suction muffler 161 may be formed of plastic material in consideration of weight or insulation.

The inner guide 162 may have a pipe shape in which one side thereof communicates with the noise space of the suction muffler 161 and the other side thereof is deeply inserted into the piston 150. The inner guide 162 may be formed in a cylindrical shape in which both ends are provided with the same inner diameter, but in some cases, the inner diameter of the front end which is the discharge side may be larger than the inner diameter of the rear end which is the opposite side thereto.

The suction muffler 161 and the inner guide 162 may be provided in various forms, through which the pressure of the refrigerant passing through the muffler unit 160 can be adjusted. The suction muffler 161 and the inner guide 162 may be integrally formed.

The discharge valve assembly 170 may include a discharge valve 171 and a valve spring 172 provided at a front side of the discharge valve 171 to elastically support the discharge valve 171. The discharge valve assembly 170 may selectively discharge the refrigerant compressed in the compression space 103. Here, the compression space 103 may be understood as a space formed between the suction valve 155 and the discharge valve 171.

The discharge valve 171 is disposed to be supported on the front surface of the cylinder 140 and may be mounted to selectively open and close the front opening of the cylinder 140. The discharge valve 171 may be operated by elastic deformation to open or close the compression space 103. The discharge valve 171 may be elastically deformed to open the compression space 103 by the pressure of the refrigerant flowing into the discharge space 104 through the compression space 103. For example, in a state where the discharge valve 171 is supported on the front surface of the cylinder 140, the compression space 103 is kept closed, and in a state where the discharge valve 171 is spaced apart from the front surface of the cylinder 140, the compressed refrigerant in the compression space 103 may be discharged to the opened space.

The valve spring 172 is provided between the discharge valve 171 and the discharge cover assembly 180 to provide an elastic force in the axial direction. The valve spring 172 may be provided as a compression coil spring or may be provided as a leaf spring in consideration of occupied space or reliability.

When the pressure in the compression space 103 is equal to or greater than the discharge pressure, the valve spring 172 deforms forward to open the discharge valve 171, and the refrigerant is discharged from the compression space 103 to be discharged to the first discharge space 103a of the discharge cover assembly 180. When the discharge of the refrigerant is completed, the valve spring 172 provides a restoring force to the discharge valve 171 so that the discharge valve 171 is closed.

A process in which the refrigerant flows into the compression space 103 through the suction valve 155 and the refrigerant in the compression space 103 through the discharge valve 171 is discharged to the discharge space 104 will be described as follows.

In the course of the piston 150 reciprocating linear movement inside the cylinder 140, when the pressure in the compression space 103 becomes a predetermined suction pressure or less, the refrigerant is suctioned to the compression space 103 while the suction valve 155 is opened. On the other hand, when the pressure in the compression space 103 exceeds a predetermined suction pressure, the refrigerant in the compression space 103 is compressed in a state where the suction valve 155 is closed.

Meanwhile, when the pressure in the compression space 103 is equal to or greater than a predetermined discharge pressure, the valve spring 172 opens the discharge valve 171 connected to the valve spring while the valve spring 172 deforms forward, and the refrigerant is discharged from the compression space 103 to the discharge space 104 of the discharge cover assembly 180. When the discharge of the refrigerant is completed, the valve spring 172 provides a restoring force to the discharge valve 171, and the discharge valve 171 is closed to seal the front of the compression space 103.

The discharge cover assembly 180 is installed in front of the compression space 103 to form a discharge space 104 to receive the refrigerant discharged from the compression space 103 and is coupled to the front of the frame 120 to attenuate noise generated in a process in which the refrigerant is discharged from the compression space 103. The discharge cover assembly 180 may be coupled to the front of the flange part 122 of the frame 120 while receiving the discharge valve assembly 170. For example, the discharge cover assembly 180 may be coupled to the flange part 122 through a mechanical coupling member.

Between the discharge cover assembly 180 and the frame 120, a gasket 165 for heat insulation and an O-ring 166 for suppressing leakage of the refrigerant in the discharge space 104 may be provided.

The discharge cover assembly 180 may be formed of a thermally conductive material. Accordingly, when a high-temperature refrigerant flows into the discharge cover assembly 180, the heat of the refrigerant may be transferred to the casing 110 through the discharge cover assembly 180 to radiate heat to the outside of the compressor.

The discharge cover assembly 180 may be formed of one discharge cover or may be disposed so that a plurality of discharge covers are sequentially communicated. When a plurality of discharge covers are provided, the discharge space 104 may include a plurality of space parts divided by each discharge cover. The plurality of space parts are disposed in the front and rear direction and communicate with each other.

For example, when there are three discharge covers, the discharge space 104 may include a first discharge space 103a formed between the first discharge cover 181 which is coupled to the front side of the frame 120 and the frame 120, a second discharge space 103b which communicates with the first discharge space 103a and formed between the second discharge cover 182 which is coupled to the front side of the first discharge cover 181 and the first discharge cover 181, and a third discharge space 103c which communicates with the second discharge space 103b and formed between the third discharge cover 183 which is coupled to the front side of the second discharge cover 182 and the second discharge cover 182.

The first discharge space 103a may selectively communicate with the compression space 103 by the discharge valve 171, the second discharge space 103b may communicate with the first discharge space 103a, and the third discharge space 103c may communicate with the second discharge space 103b. Accordingly, the refrigerant discharged from the compression space 103 passes through the first discharge space 103a, the second discharge space 103b, and the third discharge space 103c in sequence to reduce the discharge noise and may be discharged to the outside of the casing 110 through the loop pipe 115a and the discharge pipe 115, communicated to the third discharge cover 183.

The driving unit 130 may include an outer stator 131 disposed between the shell 111 and the frame 120 so as to surround the body part 121 of the frame 120, an inner stator 134 disposed between the outer stator 131 and the cylinder 140 so as to surround the cylinder 140, and a mover 135 disposed between the outer stator 131 and the inner stator 134.

The outer stator 131 may be coupled to the rear of the flange part 122 of the frame 120, and the inner stator 134 may be coupled to the outer circumferential surface of the body part 121 of the frame 120. In addition, the inner stator 134 may be disposed to be spaced apart toward the inside of the outer stator 131, and the mover 135 may be disposed in a space between the outer stator 131 and the inner stator 134.

The outer stator 131 may be equipped with a winding coil, and the mover 135 may have a permanent magnet. The permanent magnet may be composed of a single magnet having one pole or may be composed of a combination of a plurality of magnets having three poles.

The outer stator 131 includes a coil winding body 132 surrounding the axial direction of the outer stator in the circumferential direction and a stator core 133 stacked while surrounding the coil winding body 132. The coil winding body 132 may include a hollow cylindrical bobbin 132a and a coil 132b wound in the circumferential direction of the bobbin 132a. The cross-section of the coil 132b may be formed in a circular or polygonal shape and, for example, may have a hexagonal shape.

In the stator core 133, a plurality of lamination sheets may be radially stacked, and a plurality of lamination blocks may be stacked in a circumferential direction.

The front side of the outer stator 131 may be supported by the flange part 122 of the frame 120, and the rear side may be supported by the stator cover 137. For example, the stator cover 137 may be provided in the shape of a hollow disk, the outer stator 131 may be supported on the front surface, and the resonance spring 190 may be supported on the rear surface.

The inner stator 134 may be configured by stacking a plurality of laminations on the outer circumferential surface of the body part 121 of the frame 120 in the circumferential direction.

One side of the mover 135 may be coupled to and supported by the magnet frame 136. The magnet frame 136 has a substantially cylindrical shape and is disposed to be inserted into a space between the outer stator 131 and the inner stator 134. The magnet frame 136 is coupled to the rear side of the piston 150 and is provided to move together with the piston 150.

For example, the rear end part of the magnet frame 136 may be bent and extended radially inward to form a coupling part 136a, and the coupling part 136a may be coupled to the flange part 153 formed at the rear of the piston 150. The coupling part 136a of the magnet frame 136 and the flange part 153 of the piston 150 may be coupled through a mechanical coupling member.

Further, a flange part 161a formed in front of the suction muffler 161 may be interposed between the flange part 153 of the piston 150 and the coupling part 136a of the magnet frame 136. Accordingly, the piston 150, the muffler unit 160, and the mover 135 can be linearly reciprocated together in a state where the piston 150, the muffler unit 160, and the mover 135 are integrally coupled.

When current is applied to the driving unit 130, a magnetic flux is formed in the winding coil, and the mover 135 may move by generating the electromagnetic force due to the interaction between the magnetic flux formed in the winding coil of the outer stator 131 and the magnetic flux formed by the permanent magnet of the mover 135. At the same time as the axial reciprocation movement of the mover 135, the piston 150 connected to the magnet frame 136 also reciprocates in the axial direction integrally with the mover 135.

Meanwhile, the driving unit 130 and the compression units 140 and 150 may be supported in the axial direction by the support springs 116 and 117 and the resonance spring 190.

The resonant spring 118 amplifies the vibration implemented by the reciprocating motion of the mover 135 and the piston 150, thereby effectively compressing the refrigerant. Specifically, the resonance spring 118 may be adjusted to a frequency corresponding to the natural frequency of the piston 150 so that the piston 150 can perform resonance motion. In addition, the resonance spring 118 may cause a stable movement of the piston 150 to reduce vibration and noise generation.

The resonance spring 118 may be a coil spring extending in the axial direction. Both end parts of the resonance spring 118 may be connected to the vibrating body and the fixing part, respectively. For example, one end part of the resonance spring 118 may be connected to the magnet frame 136 and the other end part thereof may be connected to the back cover 123. Accordingly, the resonance spring 118 may be elastically deformed between the vibrating body vibrating at one end part thereof and the fixing part fixed to the other end part.

The natural frequency of the resonance spring 118 is designed to match the resonance frequency of the mover 135 and the piston 150 when the compressor 100 is operated, so that the reciprocating motion of the piston 150 may be amplified. However, here, since the back cover 123 provided as a fixing part is elastically supported to the casing 110 through the first support spring 116, the fixing part may not be strictly fixed.

The resonance spring 118 may include a first resonance spring 118a supported on the rear side based on the spring supporter 119 and a second resonance spring 118b supported on the front side.

The spring supporter 119 may include a body part 119a surrounding the suction muffler 161, a coupling part 119b bent in an inner radial direction from the front of the body part 119a, and a support part 119c bent in an outer radial direction at the rear of the body part 119a.

The front surface of the coupling part 119b of the spring supporter 119 may be supported by the coupling part 136a of the magnet frame 136. In addition, the inner diameter of the coupling part 119b of the spring supporter 119 may be provided to surround the outer diameter of the suction muffler 161. For example, the coupling part 119b of the spring supporter 119, the coupling part 136a of the magnet frame 136, and the flange part 153 of the piston 150 may be sequentially disposed and then integrally coupled through a mechanical member. At this time, as described above, the flange part 161a of the suction muffler 161 may be interposed between the flange part 153 of the piston 150 and the coupling part 136a of the magnet frame 136 to be fixed together.

The first resonance spring 118a may be provided between the front surface of the back cover 123 and the rear surface of the spring supporter 119, and the second resonance spring 118b may be provided between the rear surface of the stator cover 137 and the front surface of the spring supporter 119.

A plurality of first and second resonance springs 118a and 118b may be disposed in the circumferential direction of the central axis. In addition, the first resonance spring 118a and the second resonance spring 118b may be disposed parallel to each other in the axial direction or may be disposed alternately with each other. The first and second springs 118a and 118b may be disposed at regular intervals in the radial direction of the central axis. For example, three first and second springs 118a and 118b may be provided, respectively, and may be disposed at intervals of 120 degrees in the radial direction of the central axis.

Meanwhile, the compressor 100 may include a plurality of sealing members capable of increasing a coupling force between the frame 120 and parts around the frame 120.

For example, a plurality of sealing members may include a first sealing member interposed in a part where the frame 120 and the discharge cover assembly 180 are coupled and inserted into an installation groove provided at the front end part of the frame 120 and a second sealing member provided in a part in which the frame 120 and the cylinder 140 are coupled and inserted into the installation groove provided on the outer surface of the cylinder 140. The second sealing member prevents the refrigerant in the gas groove 125c formed between the inner circumferential surface of the frame 120 and the outer circumferential surface of the cylinder 140 from being leaked to the outside and can increase the coupling force between the frame 120 and the cylinder 140. The plurality of sealing members may further include a third sealing member provided at a part where the frame 120 and the inner stator 134 are coupled and inserted into an installation groove provided on an outer surface of the frame 120. Here, the first to third sealing members may have a ring shape.

The operation of the linear compressor 100 described above is as follows.

First, when a current is applied to the driving unit 130, magnetic flux may be formed in the outer stator 131 by the current flowing through the coil 132b. The magnetic flux formed in the outer stator 131 generates an electromagnetic force, and the mover 135 having a permanent magnet may linearly reciprocate by the generated electromagnetic force. This electromagnetic force may be generated in a direction (forward direction) in which the piston 150 is toward the top dead center (TDC) during the compression stroke and may be alternatively generated in a direction (rearward direction) in which the piston 150 is toward the bottom dead center (BDC). In other words, the driving unit 130 may generate thrust which is a force which pushes the mover 135 and the piston 150 in the moving direction.

The piston 150 linearly reciprocating inside the cylinder 140 may increase and decrease the volume of the compression space 103 repeatedly.

When the piston 150 moves in a direction (rearward direction) which increases the volume of the compression space 103, the pressure in the compression space 103 decreases. Accordingly, the suction valve 155 mounted in front of the piston 150 is opened, and the refrigerant remaining in the suction space 102 can be suctioned into the compression space 103 along the suction port 154. This suction stroke proceeds until the piston 150 maximizes the volume of the compression space 103 and is located at the bottom dead center.

The piston 150 having reached the bottom dead center performs a compression stroke while moving in a direction (forward direction) in which the volume of the compression space 103 is reduced by changing the movement direction. During the compression stroke, the suctioned refrigerant is compressed as the pressure in the compression space 103 increases. When the pressure in the compression space 103 reaches the set pressure, the discharge valve 171 is pushed by the pressure in the compression space 103 and is opened from the cylinder 140, and the refrigerant is discharged to the discharge space 104 through the spaced space. This compression stroke continues while the piston 150 moves to the top dead center where the volume of the compression space 103 is minimum.

As the suction stroke and the compression stroke of the piston 150 are repeated, the refrigerant flowing into the receiving space 101 inside the compressor 100 through the suction pipe 114 flows into the suction space 102 inside the piston 150 via the suction guide 116a, the suction muffler 161, and the inner guide 162 in sequence, and the refrigerant in the suction space 102 flows into the compression space 103 inside the cylinder 140 during the suction stroke of the piston 150. During the compression stroke of the piston 150, the refrigerant in the compression space 103 is compressed and discharged to the discharge space 104, and then the flow discharged to the outside of the compressor 100 through the loop pipe 115a and the discharge pipe 115 can be formed.

Hereinafter, the piston 200 according to the first embodiment of the present disclosure will be described with reference to FIGS. 3 to 9.

Figure 3:
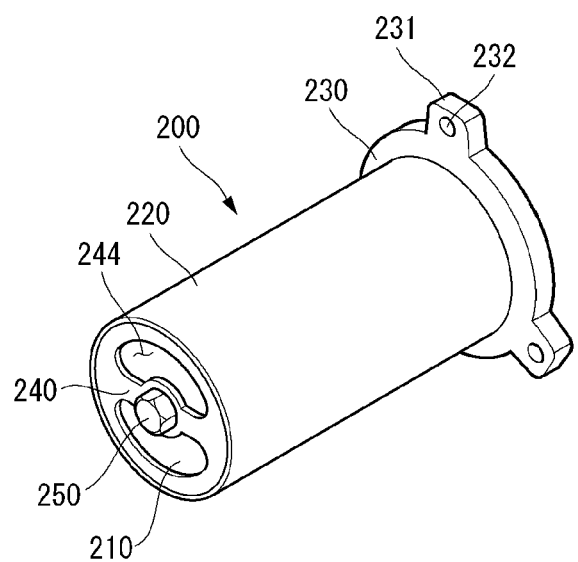
FIG. 3 is a perspective view illustrating a piston according to a first embodiment of the present disclosure.
Figure 4:
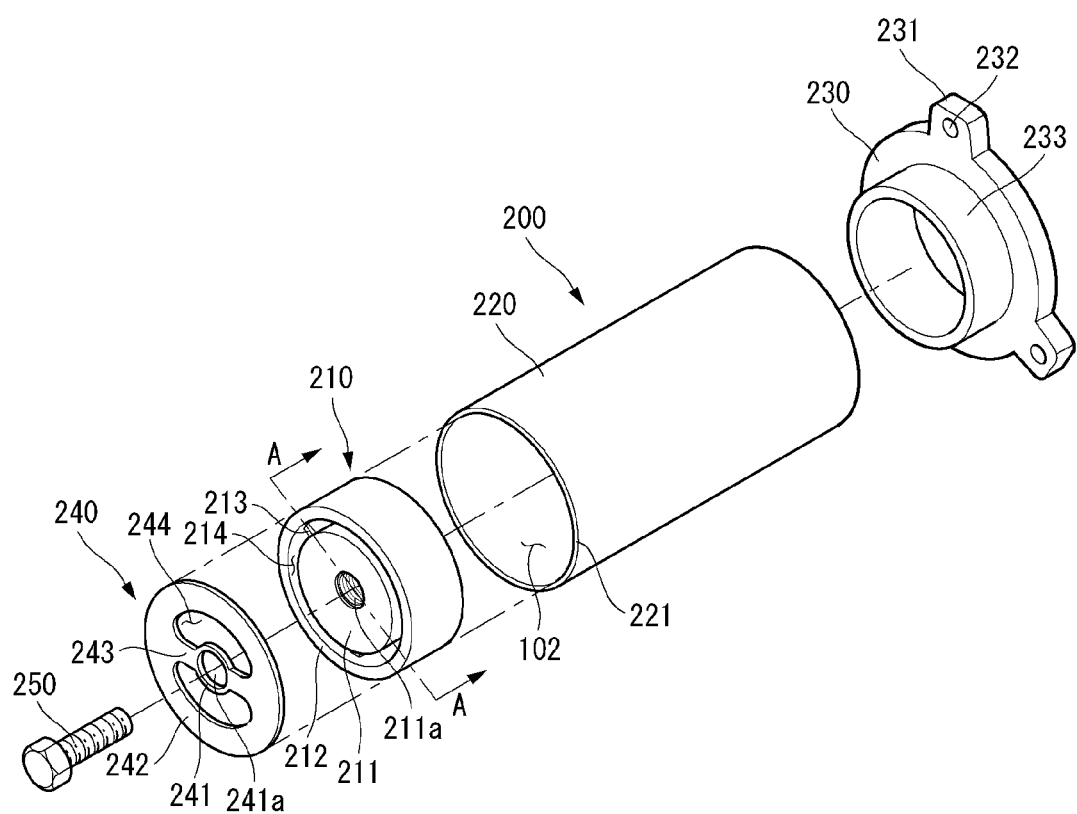
FIG. 4 is an exploded perspective view of FIG. 3.
Figure 5:
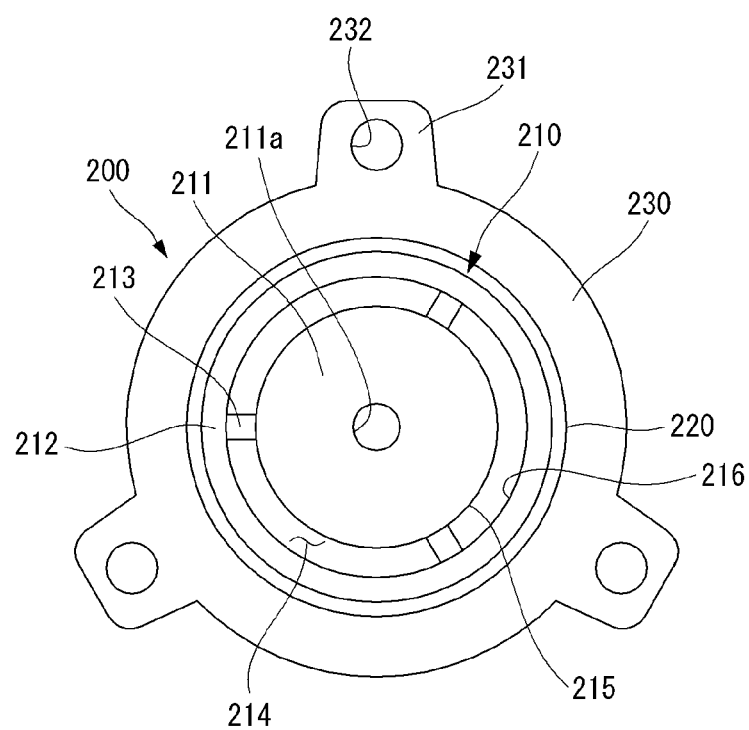
FIG. 5 is a plan view illustrating a state where the suction valve is separated.
Figure 6:
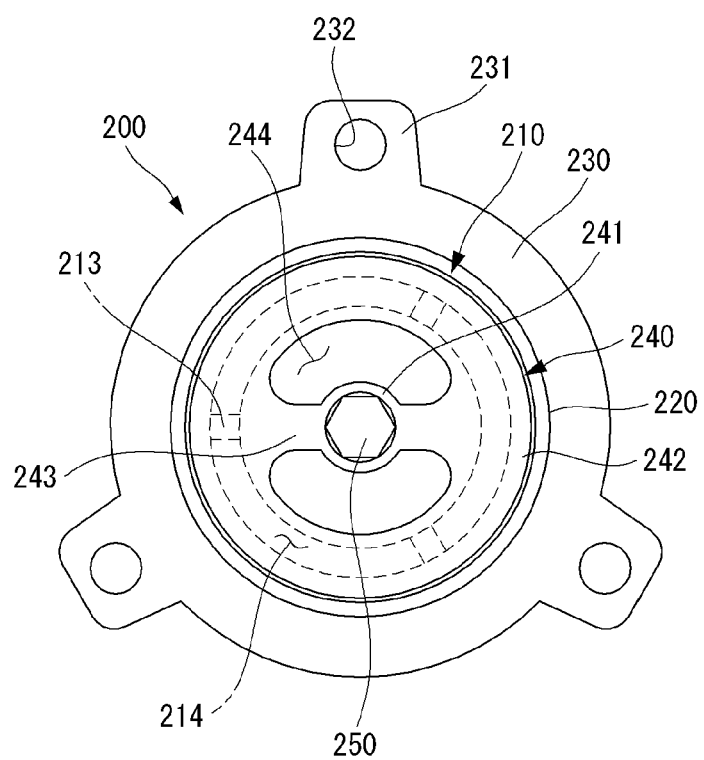
FIG. 6 is a plan view illustrating a state where a suction valve is mounted.

FIG. 3 is a perspective view illustrating a piston 200 according to a first embodiment of the present disclosure, and FIG. 4 is an exploded perspective view of FIG. 3. In addition, FIG. 5 is a plan view illustrating a piston in a state where the suction valve 240 is separated, and FIG. 6 is a plan view illustrating a piston in a state where a suction valve 240 is mounted.

Referring to FIGS. 3 to 6, the piston 200 according to the first embodiment of the present disclosure includes a slider 220 for sliding inside a cylinder (see 140 in FIG. 2), a head 210 provided in front of the slider 220, and a flange part 230 provided at the rear of the slider 220.

The piston 200 may further include a suction valve 240 for opening and closing a suction port 214 formed in the head 210 and a fastening member 250 for fixing the suction valve 240 to the head 210.

The slider 220 may be formed in a cylindrical shape.

In detail, the slider 220 may be provided in a cylindrical shape long in the axial direction to correspond to the shape of the inner wall of the cylinder 140 and may be hollow and provided to have a constant thickness in the circumferential direction.

The inner space of the slider 220 may form a suction space 102 into which the refrigerant received in the receiving space (see 101 in FIG. 2) flows.

Since the slider 220 performs linear reciprocating motion in a state where the outer wall of the slider directly faces the inner wall of the cylinder 140, friction may occur between the outer wall of the slider and the inner wall of the cylinder 140. Therefore, in order to prevent friction, surface treatment may be performed on the outer circumferential surface. Abrasion resistance, lubricity, or heat resistance may be improved through such surface treatment. In this case, the surface treatment may be performed not only on the outer circumferential surface of the slider 220 but also on the inner circumferential surface of the cylinder 140.

Meanwhile, the surface treatment of the slider 220 may be performed not only on the outer circumferential surface but also on the inner circumferential surface. In this case, during the surface treatment process, the outer circumferential surface and the inner circumferential surface may be surface-treated at the same time. When the surface treatment of the slider 220 is performed only on the outer circumferential surface, there is an advantage of saving the coating material, and when the surface treatment of the slider 220 is performed on both the outer circumferential surface and the inner circumferential surface, there is an advantage that the surface treatment process is simplified.

The surface treatment of the slider 220 may use any one of diamond-like carbon (DLC), Teflon (PTFE), nickel-phosphorus alloy material, and anodizing layer.

DLC is a new amorphous carbon-based material and includes material in the form of a thin film formed by electrically accelerating carbon ions or activated hydrocarbon molecules in plasma and colliding with the surface.

The physical properties of DLC are similar to diamond, have high hardness and abrasion resistance, excellent electrical insulation, and low coefficient of friction, so DLC has excellent lubricity properties.

As another example, PTFE is sprayed onto the object to be coated in a state where the object is painted with fluororesin and is heated and sintered at a constant temperature to form an inert coating layer. Since PTFE has a low coefficient of friction, PTFE can improve the lubricity and wear resistance of the surface.

As another example, the nickel (Ni)-phosphorus (P) alloy material may be provided on the outer circumferential surface of the piston 200 or the inner circumferential surface of the cylinder 140 by an electroless nickel plating method and may be formed by depositing nickel and phosphorous on the surface with a uniform thickness. The nickel-phosphorus alloy material may have a chemical composition ratio of 90 to 92% of nickel (Ni) and 9 to 10% of phosphorus (P). The nickel-phosphorus alloy material improves the corrosion resistance and abrasion resistance of the surface and has excellent lubricity properties.

As another example, an anodizing technology is a type of aluminum painting and is a processing technology that uses the property which uses aluminum as an anode and when energized, the aluminum surface is oxidized by oxygen generated from the anode to form an aluminum oxide film and thus has excellent properties of corrosion resistance and insulation resistance.

The flange part 230 may be provided to extend outward from the rear of the slider 220 in the radial direction. In a state where the piston 200 is coupled to the cylinder 140, the flange part 230 is located at the rear of the cylinder 140.

The flange part 230 may be provided to be coupled to the slider 220. In this case, an insert part 233 inserted in the rear of the slider 220 may be formed in front of the flange part 230. The insert part 233 has an outer diameter corresponding to the inner diameter of the slider 220 and may be press-fitted to the rear of the slider 220 or fixed through an adhesive.

As another example, unlike the drawings, the flange part 230 may be integrally formed with the slider 220. In this case, the flange part 230 may be formed by being bent outward from the rear end part of the slider 220 in the radial direction.

The flange part 230 has a space penetrating in the axial direction therein, so that a refrigerant may flow into space. For example, an inner guide (see 162 in FIG. 2) of the muffler unit (see 160 in FIG. 2) is disposed to pass through the inner space of the flange part 230, and the refrigerant may flow into the suction space 102 inside the slider 220 through the inner guide 162.

In addition, the flange part 230 may further include a coupling part 231 for coupling with the magnet frame (see 136 in FIG. 2). The coupling parts 231 are formed to protrude outward in the radial direction of the flange part 230, and a plurality of coupling parts 231 may be disposed at regular intervals in the circumferential direction. For example, three coupling parts 231 may be formed on the flange part 230 at intervals of 120 degrees.

The coupling part 231 forms a coupling hole 232 for integrally fastening with the magnet frame 136 disposed at the rear of the flange part 230. The magnet frame 136 may also form a coupling hole corresponding to the coupling hole 232 of the flange part 230. The flange part 230 and the magnet frame 136 may be integrally coupled by a pin or a screw passing through the coupling hole.

The head 210 may be provided in front of the slider 220 to partially seal the front opening of the slider 220. Here, the meaning of partially sealing may be understood to mean sealing a part other than the suction port 214.

The head 210 may be provided as a separate member inserted into and coupled to the front opening of the slider 220. Alternatively, the head 210 may be formed integrally with the slider 220.

The head 210 may be generally provided in a cylindrical shape extending in the axial direction.

The outer diameter of the head 210 may be provided to correspond to the inner diameter of the slider 220. The head 210 may be press-fitted to the slider 220 or fixed through an adhesive.

When the head 210 is press-fitted to the slider 220, a step may be formed on the inner circumferential surface of the slider 220. For example, the slider 220 may have a step in which the inner diameter slightly decreases while going from the front end part to the rear. In this case, the length from the front end part to the step of the slider 220 may be the same as the length of the head 210 in the axial direction.

Accordingly, when the head 210 is pushed to the part where the step is formed, the front end part of the head 210 and the front end part of the slider 220 may be disposed on the same plane.

However, in this way, in order to press-fit the head 210 to the slider 220, additional processing of forming a step on the inner circumferential surface of the slider 220 is required, and if the accuracy of the step is deteriorated, leakage may occur in the suction valve 240.

In more detail, the front end part of the head 210 is not formed in the same plane as the front end part of the slider 220 due to the occurrence of the error of the step formed on the inner circumferential surface of the slider 220, and thus in the closed state of the suction valve 240, leakage may occur through a gap in the front end part of the piston 200.

In addition, durability may be deteriorated as the suction valve 240 repeatedly hits the front end part of the head 210 or the front end part of the slider 220 that does not form the same plane.

To prevent this, the head 210 may be mounted on the slider 220 in a way that is fixed through an adhesive. When the head 210 is fixed using an adhesive, there is no need to process a separate step on the inner circumferential surface of the slider 220, and the head 210 moves according to use, so that it is very unlikely that the front end part of the piston 200 deviates in a single plane. For this reason, the reliability and durability of the suction valve 240 may be improved.

Figure 7:
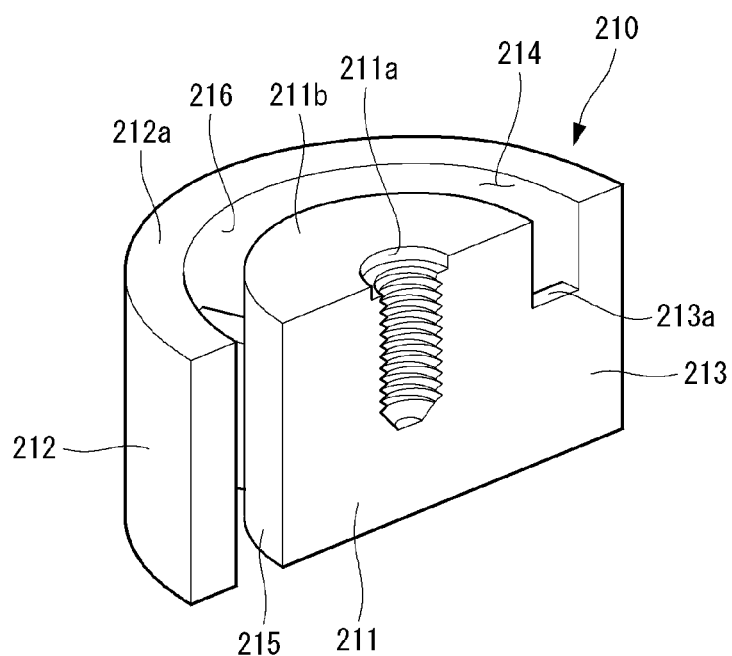
FIG. 7 is a cut-away perspective view illustrating a state where a head is cut along line A-A in FIG. 4.

FIG. 7 is a cut-away perspective view illustrating a state where the head 210 is cut along line A-A in FIG. 4. In addition, FIG. 8 is a cross-sectional view illustrating a state where a suction valve 240 is closed in the piston 200 according to the first embodiment of the present disclosure, and FIG. 9 is a cross-sectional view illustrating a state where the suction valve 240 is opened in FIG. 8.

Figure 8:
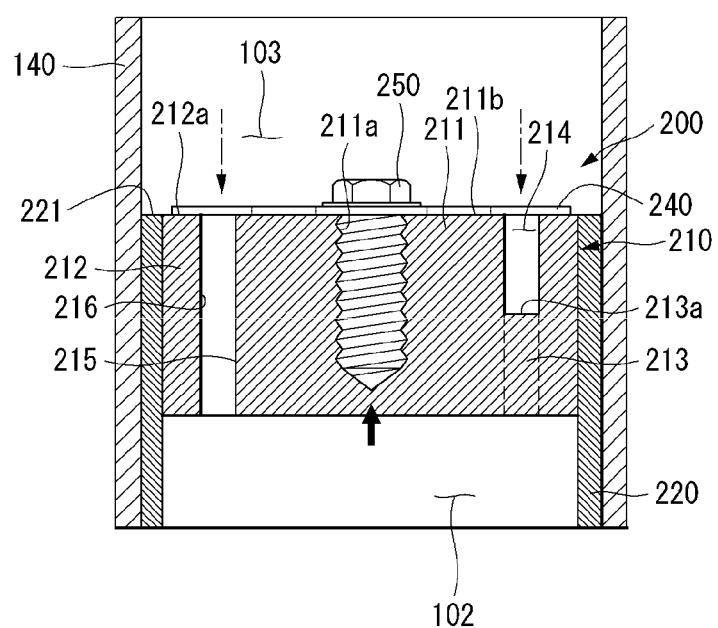
FIG. 8 is a cross-sectional view illustrating a state where a suction valve is closed in the piston according to the first embodiment of the present disclosure.
Figure 9:
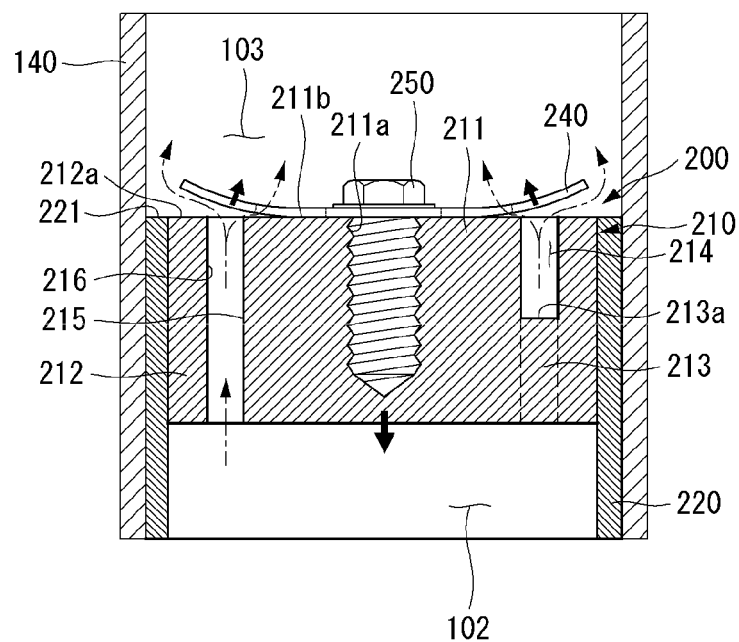
FIG. 9 is a cross-sectional view illustrating a state where the suction valve is opened in FIG. 8.

Referring to FIGS. 7 to 9, the head 210 may include an inner body 211 and an outer body 212 spaced apart from the inner body 211 and surrounding the inner body 211.

The inner body 211 may be provided to have the same central axis as the central axis of the piston 200. In other words, the central axis of the inner body 211 may be understood as the central axis of the piston 200.

The head 210 may further include a bridge 213 connecting the inner body 211 and the outer body 212.

Referring to FIG. 5, when looking at the head 210 from the compression space 103, the outer circumferential surface 215 of the inner body 211 is provided in a circular shape, and the inner circumferential surface 216 of the outer body 212 may be provided in a circular shape receiving the inner body 211 therein.

In other words, it may be understood that the outer circumferential surface 215 of the inner body 211 and the inner circumferential surface 216 of the outer body 212 have a circular cross-section.

The inner body 211 may have a cylindrical shape extending in the axial direction, and the outer body 212 may have a hollow cylindrical shape extending in the axial direction.

The outer diameter of the outer body 212 may correspond to the inner diameter of the slider 220.

One side of the bridge 213 may be connected to the outer circumferential surface 215 of the inner body 211 and the other side may be connected to the inner circumferential surface 216 of the outer body 212.

Here, both the front end part 211b of the inner body 211 of the head 210 and the front end part 212a of the outer body 212 may be disposed on the same plane as the front end part 221 of the slider 220.

For example, the surface of the front end part 221 of the slider 220 and the surfaces of the front end parts 211b and 212a of the head 210 may be gathered to form a compression surface of the piston 150.

In the head 210, the inner body 211, the outer body 212, and the bridge 213 may be integrally formed.

For example, the head 210 may be manufactured by a sintering process or an injection process. By integrally forming the head 210, it is possible to shorten the manufacturing process time and improve the durability of the piston 200.

The space surrounded by the inner body 211 and the outer body 212 may form a suction port 214 through which the refrigerant in the suction space 102 is discharged to the compression space 103. Specifically, the space between the outer circumferential surface 215 of the inner body 211 and the inner circumferential surface 216 of the outer body 212 forms a suction port 214 extending in the front and rear direction.

Hereinafter, the difference between the suction ports 11 and 214 will be described by comparing the piston 10 illustrated in FIG. 1 with the piston 200 according to the embodiment of the present disclosure.

The piston 200 according to an embodiment of the present disclosure may increase the area of the suction port 214. When the area of the suction port 214 increases, the pressure loss of the refrigerant decreases. Specifically, the pressure loss of the refrigerant is related to the shape of the suction port 214 and can be calculated according to the following equation.

$$\Delta P \propto \frac{L * V^2}{D} \qquad \text{[Calculation Equation 1]}$$

(where, ΔP: pressure loss, L: flow path length, V: flow rate, D: flow path diameter)

In other words, the pressure loss increases in proportion to the square of the flow rate and decreases as the diameter of the suction port 214 increases. In other words, as the area of the suction port 214 increases, the flow area increases, and the flow rate decreases, thereby reducing the pressure loss.

In the piston 10 illustrated in FIG. 1, eight suction ports 11 having a circular cross-section are radially disposed. In this case, if the size of the suction ports 11 increases or the distance between the adjacent suction ports 11 decreases to increase the number of the suction port, the flow area of the suction ports 11 can increase. However, in this case, the area in which the suction valve 20 is seated may be reduced, and the suction valve 20 may be damaged by the pressure applied during the compression stroke, thereby causing a problem in which the refrigerant is leaked. For this reason, since the number and disposition position of the suction ports 11 are set to an optimal value, there is inevitably a limit to increasing the flow area.

However, in the piston 200 according to the embodiment of the present disclosure, since most of the arc space between the outer body 212 and the inner body 211 (area excluding the bridge 213) forms the suction port 214, the flow area may increase significantly. Due to the advantage of the shape, the position of the suction port 214 may be moved to the inside of the piston 200 as long as the flow area can be secured, and as the suction port 214 moves inward, the area in which the suction valve 240 is seated on the head 210 increases, so that durability of the suction valve 240 may be improved.

Figure 10:
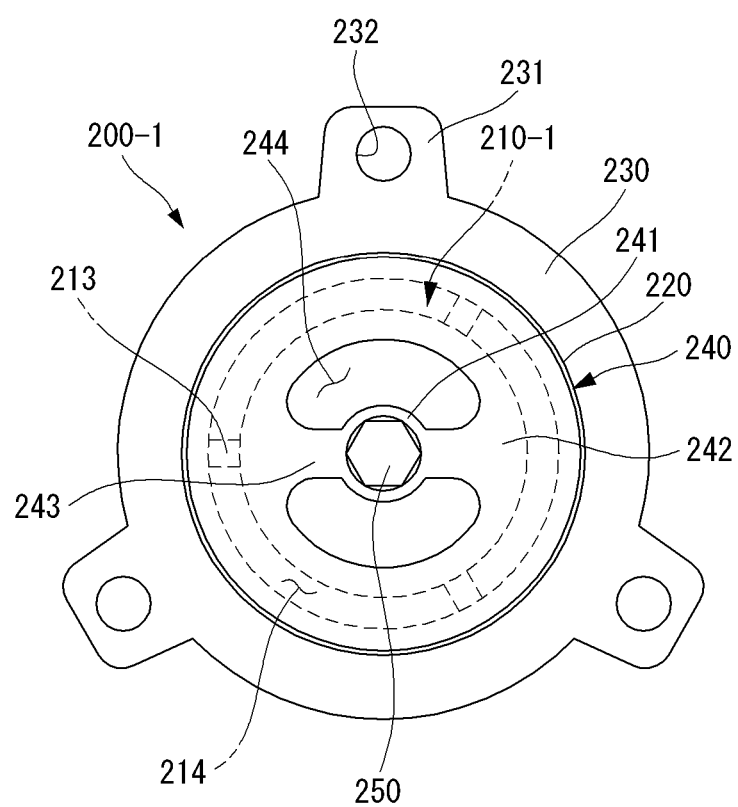
FIG. 10 is a plan view illustrating a piston according to a comparative embodiment of the present disclosure.
Figure 11:
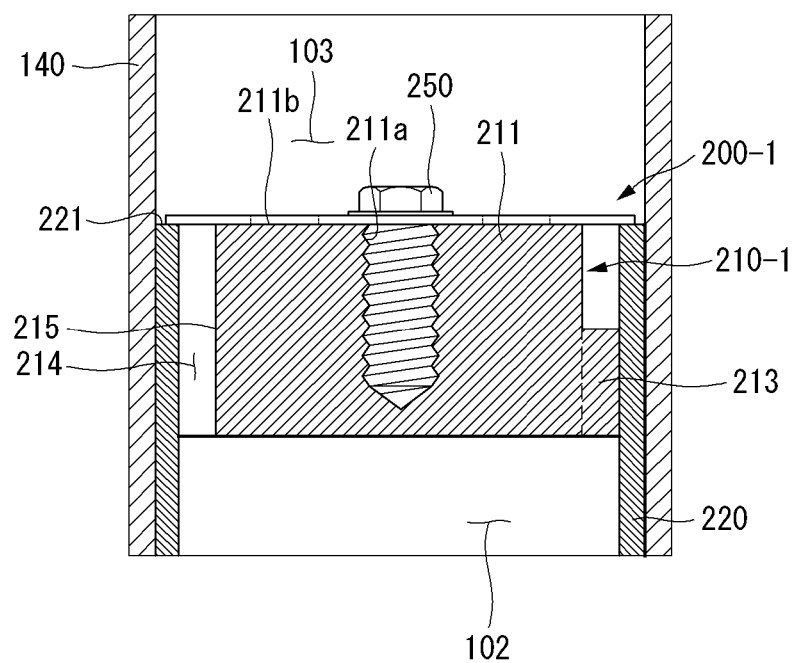
FIG. 11 is a cross-sectional view of FIG. 10.

FIG. 10 is a plan view illustrating a piston 200-1 according to a comparative embodiment of the present disclosure, and FIG. 11 is a cross-sectional view of FIG. 10.

Referring to FIGS. 10 and 11, the piston 200-1 according to the comparative embodiment is the same in that the head 210-1 is inserted into the slider 220, but as the piston 200 according to an embodiment of the present disclosure, the head 210 is not divided into an inner body 211 and an outer body 212.

In addition, the piston 200-1 according to the comparative embodiment is different in that a suction port 214 is formed between the head 210-1 and the slider 220. In this case, there is an advantage that the diameter of the suction port 214 having an arc shape may increase, but problems accompanying this may occur.

First, the durability of the suction valve 240 may be a problem. Since the suction valve 240 has to be able to close the suction port 214, the suction port 214 has to be located inside the outer surface of the suction valve. To this end, the diameter of the suction valve 240 is provided to have a diameter larger than the diameter (outer diameter) of the suction port 214.

In this case, a part of the suction valve 240 is seated on the interface between the slider 220 and the head 210-1. By design, the front end part 221 of the slider 220 and the front end part 211b of the head 210-1 form the same plane, but due to processing problems, assembly problems, or deformation problems due to use, there may be a case where the front end part 221 of the slider 220 and the front end part 211b of the head 210-1 do not form the same plane.

In this case, two problems arise. First, leakage of the refrigerant may occur due to a step between the slider 220 and the head 210-1. Second, damage to the suction valve 240 may occur due to a step between the slider 220 and the head 210-1.

The suction valve 240 has a movement of repeatedly blocking and opening the suction port 214 while passing through the compression stroke and the suction stroke. At this time, if there is a step on the surface on which the suction valve 240 is seated, damage may be caused by repeated movement of the suction valve 240, and the damage may be also the cause of not only degrading the durability of the suction valve 240 but also contaminating the refrigerant.

Next, there is a problem that the discharge resistance of the suction port 214 around the inner wall of the cylinder 140 may increase. During the suction stroke, the refrigerant discharged through the suction port 214 is discharged through two routes. One is a route discharged through an opening hole 244 of the suction valve 240, and the other is a route discharged into the space between the suction valve 240 and the cylinder 140. Hereinafter, the flow path resistance generated in the second route will be described.

As illustrated in FIG. 1, when the suction port 214 is formed in a circular shape, the shape of the wing part 242 can be easily deformed, but in a case of the piston 200-1 according to the comparative embodiment, since the suction port 214 is formed in an arc shape, there is a limitation in designing the shape of the wing part 242 to be easily deformed. In this situation, if the interval between the outer circumferential edge of the suction valve 240 and the inner circumferential surface of the cylinder 140 is narrow, flow path resistance may increase during the process of discharging the refrigerant through this interval. This is because the pressure loss increases as the flow path diameter decreases, as seen in [Calculation Equation 1].

In comparison, in the piston 200 according to the embodiment of the present disclosure, the head 210 is divided into an inner body 211 and an outer body 212, and there is a difference in that the suction port 214 is formed in the space between the inner body 211 and the outer body 212.

In a case of the piston 200 according to the embodiment of the present disclosure, since the suction valve 240 is not seated at the boundary between the slider 220 and the head 210 but only seated in the head 210, no step is formed on the surface on which the suction valve 240 is seated. Therefore, the problems of the durability of the suction valve 240 and contamination of the refrigerant described above do not occur.

In addition, since, as the diameter (outer diameter) of the suction port 214 decreases, the diameter of the suction valve 240 decreases, the interval between the outer circumferential edge of the suction valve 240 and the inner circumferential surface of the cylinder 140 can be secured. Therefore, when the refrigerant is discharged between the suction valve 240 and the cylinder 140, the flow path resistance decreases.

When the piston 200 according to the embodiment of the present disclosure is described again with reference to FIGS. 7 to 9, the suction port 214 may have an arc shape or a circular ring shape extending in a circumferential direction when viewed from the front.

The suction port 214 may extend in a radial direction from the inner body 211 toward the outer body 212.

The suction port 214 may extend in a radial direction and may be formed by dividing a plurality of flow paths in a circumferential direction by a bridge 213 connecting the inner body 211 and the outer body 212.

The bridge 213 may extend radially around a central axis of the head 210.

In addition, a plurality of the bridges 213 may be disposed to be spaced apart in the circumferential direction. For example, three bridges 213 may be provided at intervals of 120 degrees. In this case, the suction port 214 may form an arc-shaped flow path having an angle of approximately 120 degrees.

The front end part 213a of the bridge 213 may be disposed at a predetermined distance from the front end part 211b and 212a of the head 210.

In detail, the front end part 213a of the bridge 213 may be disposed rearwardly spaced apart from the front end part 211b of the inner body 211 and the front end part 212a of the outer body 212.

In other words, the front end part 211b of the inner body 211 and the front end part 212a of the outer body 212 may not be formed on the same plane as the front end part 213a of the bridge 213.

Accordingly, the length of the bridge 213 in the axial direction may be shorter than that of the inner body 211 and the outer body 212.

Due to such a position of the bridge 213, the fluid behavior of the refrigerant discharged through the suction port 214 to the inlet of the suction valve 240 (the rear surface of the suction valve 240) may be uniform.

If the front end part 213a of the bridge 213 forms the same plane as the front end parts 211b and 212a of the head 210 or is disposed adjacent to the front end parts 211b and 212a of the head 210, the fluid behavior of the refrigerant in a region around the bridge 213 in the vicinity of the suction valve 240 and a region away from the bridge 213 by a predetermined distance may be different from each other. However, as the bridge 213 is disposed away from the front end parts 211b and 212a of the head 210, the flow of the refrigerant passing through the flow paths on both sides of the bridge 213 meets while passing in front of the bridge 213, and, as a result, a uniform refrigerant fluid behavior is formed in the vicinity of the front end parts 211b and 212a of the head 210. In other words, since the connection position of the bridge 213 is located at the rear of the head 210, a uniform refrigerant fluid behavior is formed around the inlet of the suction valve 240, thereby increasing the discharge efficiency.

Meanwhile, a coupling groove 211a to which the fastening member 250 for mounting the suction valve 240 is coupled may be formed on the inner body 211. The coupling groove 211a may be formed in the center of the inner body 211.

The coupling groove 211a may be formed by being recessed rearward from the front end part 211b of the inner body 211. The coupling groove 211a may be recessed in a direction parallel to the central axis of the piston 200.

A coupling hole 241a through which the fastening member 250 passes may be formed in the suction valve 240. The coupling hole 214a may be formed in the center of the suction valve 240.

The coupling groove 211a of the inner body 211 and the coupling hole 241a of the suction valve 240 are provided at positions corresponding to each other, and the fastening member 250 penetrates the coupling hole 241a to couple to the coupling groove 211a, and thus the suction valve 240 may be fixed to the head 210.

For example, the fastening member 250 may be a screw member, and a thread may be formed on the inner circumferential surface of the coupling groove 211a.

The suction valve 240 is mounted on the front surface of the piston 200. The suction valve 240 may be provided as a circular thin plate member or sheet.

The suction valve 240 may be provided to be reversibly deformed in shape. Therefore, during the suction stroke in which the piston 200 moves backward, the suction port 214 opens while the suction valve 240 deforms so that the refrigerant in the suction space 102 is discharged into the compression space, and during the compression stroke in which the piston 200 moves forward, the suction valve 240 closes the suction port 214 to prevent the refrigerant in the compressed space from returning to the suction space 102 again.

The suction valve 240 includes a fixing part 241 fixed to the head 210, a wing part 242 that is deformable to seal or open the suction port 214, and a connection part 243 connecting the fixing part 241 and the wing part 242.

The fixing part 241 is located at the central part of the suction valve 240 and may be formed to surround the coupling hole 241a.

The wing part 242 may be disposed outward from the fixing part 241 in the radial direction, and the connection part 243 may extend from the fixing part 241 in a radial direction to be connected to the wing part 242.

A plurality of connection parts 243 may be provided. The plurality of connection parts 243 may be disposed to be spaced apart in a circumferential direction.

For example, the plurality of connection parts 243 may be disposed to face each other.

An opening hole 244 through which a refrigerant can flow when the suction port 214 is opened may be formed in the suction valve 240.

The opening hole 244 may be formed in a shape surrounded by the fixing part 241, the connection part 243, and the wing part 242. For example, the opening holes 244 may be formed in a number corresponding to the number of the connection parts 243.

In this case, the suction valve 240 is provided as a single member, and the fixing part 241, the wing part 242, and the connection part 243 may be understood as separate areas for convenience.

A coupling hole 241a corresponding to the coupling groove 211a of the inner body 211 is formed in the center of the fixing part 241, and the fastening member 250 may penetrate the coupling hole 241a and may be coupled to the inner body 211. In other words, the fixing part 241 may be described as a region in which deformation does not occur due to a pressing force (coupling force) while the fastening member 250 is coupled.

The wing part 242 is provided to cover the suction port 214. The width of the wing part 242 in the radial direction may be larger than the width of the suction port 214 in the radial direction.

In other words, the outer edge of the wing part 242 is located outside the inner circumferential surface 216 of the outer body 212 in the radial direction, and the inner edge of the wing part 242 forming a part of the opening hole 244 may be located inside the outer circumferential surface 215 of the inner body 211 in the radial direction.

In other words, the outer circumferential edge of the wing part 242 is disposed outside the outer part of the suction port 214 in the radial direction, and the inner edge of the wing part 242 may be disposed inside an inner part of the suction port 214 in the radial direction.

In this case, an outer part of the suction port 214 may be understood as an inner circumferential surface 216 of the outer body 212, and an inner part thereof may be understood as an outer circumferential surface 215 of the inner body 211.

The opening hole 244 may be defined as a region of the suction valve 240 excluding the fixing part 241, the wing part 242, and the connection part 243. In other words, the opening hole 244 may mean a space surrounded by the fixing part 241, the wing part 242, and the connection part 243.

The opening hole 244 may be formed to be non-overlapping with the suction port 214 in the axial direction in a state where the suction valve 240 is in close contact with the head 210. For example, the opening hole 244 is disposed in the inner region of the suction port 214 in the radial direction, and the outer part of the opening hole 244 may be disposed inside the inner part of the suction port 214 in the radial direction.

In addition, the opening hole 244 may be provided as a wide area as possible. When the opening hole 244 is provided wide, the discharge resistance of the refrigerant discharged from the suction port 214 may be reduced. For example, the opening hole 244 may be a fan shape extending in a radial direction at an angle of approximately 180 degrees around the fixing part 241, and a pair of opening holes 244 facing each other may be disposed facing each other.

Referring to FIG. 8, during the compression stroke in which the piston 200 moves forward, the suction valve 240 closes the suction port 214 to prevent the refrigerant in the compression space 103 from returning to the suction space 102 again.

In more detail, the suction valve 240 does not deform due to force acting from the front. In other words, when the pressure of the compression space 103 acts backward on the suction valve 240 during the compression stroke, the wing part 242 is seated on the front end parts 211b and 212a of the head 210 and thus the suction valve 240 can be kept a state of closing the suction port 214.

Referring to FIG. 9, during a suction stroke in which the piston 200 moves backward, the suction valve 240 is bent forward by the inertia of the refrigerant in the suction port 214 to open the suction port 214, and the refrigerant of the suction space 102 is discharged into the compression space 103.

In more detail, the suction valve 240 may be deformed by force acting from the rear to the front to open the suction port 214. In other words, while the piston 200 moves backward during the suction stroke, the refrigerant in the suction space 102 relatively moves to the compression space 103 located in front of the piston 200 by inertial force.

At this time, the suction valve 240 is bent forward due to the flow of the refrigerant moving forward, and the suction valve 240 is bent forward to open the suction port 214. The refrigerant discharged from the suction port 214 moves to the compression space through the opening hole 244 of the suction valve 240 and the space between the wing part 242 and the cylinder 140.

Meanwhile, as described above, in a case where the head 210 is bonded and coupled to the slider 220, since the front end parts 211b and 212a of the head 210 and the front end part 221 of the slider 220 form the same plane, the step does not occur, but there is a possibility that the step may occur due to an operator's mistake.

As such, when a step exists in the front of the piston 200 facing the compression space 103 and the diameter (outer diameter) of the suction valve 240 is larger than the diameter (outer diameter) of the head 210, the wing part 242 of the suction valve 240 hits a step in a process of being deformed and then restored. If this process is repeated, particles due to collision may be generated in the wing part 242 or the head 210 of the suction valve 240, thereby contaminating the refrigerant. In addition, a small amount of refrigerant may leak through a step even in a state where the suction valve 240 closes the suction port 214.

For this reason, the diameter (outer diameter) of the suction valve 240 may be equal to or smaller than the diameter (outer diameter) of the head 210. In this case, even if there is a step on the compression surface of the piston 200, the suction valve 240 does not contact the part of the step, so that there is no fear of leakage or particle generation.

However, in a case where the diameter of the suction valve 240 decreases, the area of the opening hole 244 has to also decrease in proportion to the diameter. Therefore, there may be a concern that the flow path through which the refrigerant discharged to the compression space 103 through the suction port 214 passes is narrowed. However, as illustrated in FIG. 9, the refrigerant discharged through the suction port 214 can flow through the opening hole 244 as well as can also flow into space between the wing part 242 of the suction valve 240 and the inner wall of the cylinder 140. When the diameter of the suction valve 240 decreases, the interval between the wing part 242 of the suction valve 240 and the inner wall of the cylinder 140 increases, so that the area of the flow path through which the refrigerant discharged into the compression space 103 through the suction port 214 passes increases.

Figure 12:
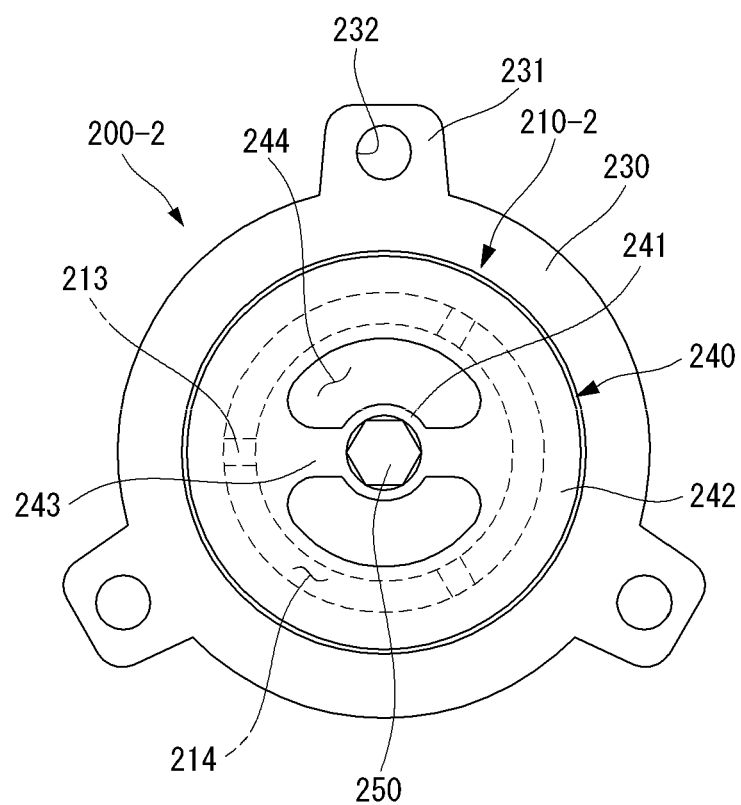
FIG. 12 is a plan view illustrating a state where a suction valve is mounted in a piston according to a second embodiment of the present disclosure.
Figure 13:
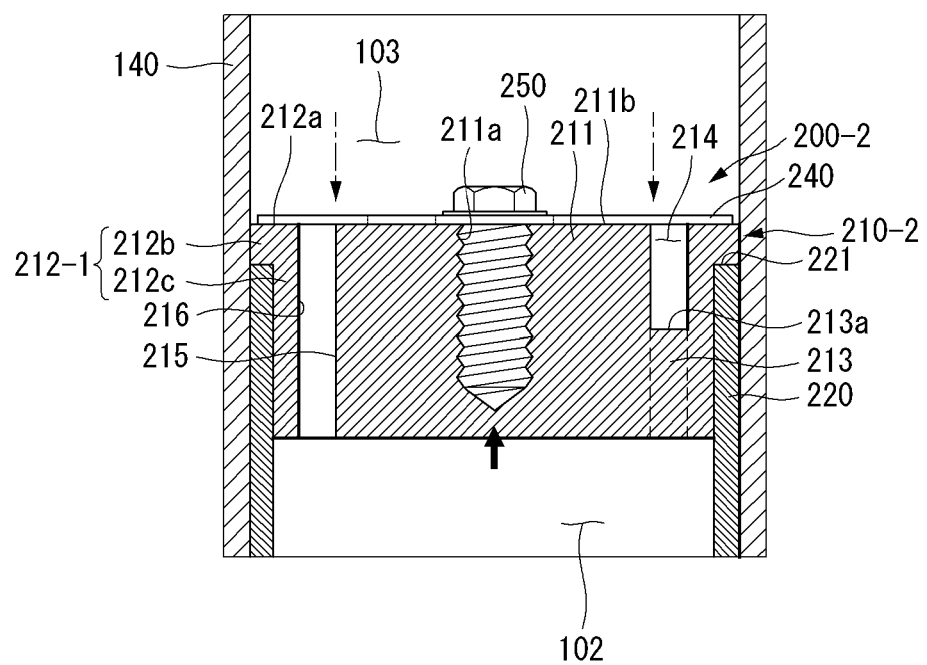
FIG. 13 is a cross-sectional view illustrating a state where a suction valve is closed in FIG. 12.

FIG. 12 is a plan view illustrating a state where a suction valve 240 is mounted in a piston 200-2 according to a second embodiment of the present disclosure, and FIG. 13 is a cross-sectional view illustrating a state where a suction valve 240 is closed in FIG. 12.

Referring to FIGS. 12 and 13, the piston 200-2 according to the second embodiment of the present disclosure is provided so that the head 210-2 covers the front end part 221 of the slider 220.

Specifically, the head 210-2 may include an inner body 211 including a central axis of the piston 200, an outer body 212-2 spaced apart from the inner body 211 in the radial direction and surrounding the inner body 211, and a bridge 213 connecting the inner body 211 and the outer body 212-1.

The outer body 212-1 may be provided so that the outer diameters of the front part and the rear part are different from each other. In other words, the outer body 212-1 may be formed as a form which is inserted into the slider 220 and seated on the front end part 221 of the slider 220.

The outer body 212-1 may include a cover part 212b provided to cover the front end part 221 of the slider 220. The cover part 212b may be formed in front of the outer body 212-1.

The outer diameter of the cover part 212b may be equal to or slightly smaller than the outer diameter of the slider 220. In other words, the cover part 212b may be seated on all or at least a part of the front end part 221 of the slider 220.

The outer body 212-1 may further include an insert part 212c inserted into the opening (inside) of the slider 220. The insert part 212c may be formed at the rear of the outer body 212-1. In detail, the insert part 212c may be formed to extend rearward from the cover part 212b.

The outer diameter of the insert part 212c may correspond to the inner diameter of the slider 220.

In other words, the outer body 212-1 may include an insert part 212c inserted into the slider 220, and cover part 212b which extends in a radial direction from the insert part 212c and seated on the front end part 221 of the slider 220.

The head 210-2 may be press-fitted to the slider 220. When the head 210-2 is coupled to the slider 220, the insert part 212c is inserted into the opening of the slider 220, and the rear surface of the cover part 212b and the front end part 221 of the slider 220 may be disposed facing each other. The head 210-2 may be more firmly coupled to the slider 220 using an adhesive.

In the piston 200-2 according to the second embodiment of the present disclosure, the head 210-2 may form a compression surface of the piston 200. Specifically, the front end part 211b of the inner body 211 and the front end part 212a of the outer body 212 may form a compression surface.

The suction valve 240 may be seated at the front end parts 211b and 212a of the head 210-2. In this case, the diameter (outer diameter) of the suction valve 240 may be equal to or slightly smaller than the diameter (outer diameter) of the cover part 212b.

In addition, the diameter (outer diameter) of the suction valve 240 may be larger than the inner diameter of the slider 220. In other words, the diameter (outer diameter) of the suction valve 240 may be formed to be larger than the inner diameter of the slider 220 and to be smaller than the inner diameter of the cylinder 140, the outer diameter of the slider 220, and the outer diameter of the cover part 212b.

When comparing FIGS. 8 and 13, it can be seen that the suction valve 240 of FIG. 13 has a larger diameter than the suction valve of FIG. 8. By increasing the diameter of the suction valve 240, the area of the flow path through which the refrigerant discharged from the suction port 214 passes can increase, thereby increasing the flow rate of the refrigerant discharged into the compression space.

The distance between the outer circumferential edge of the suction valve 240 and the outer part of the suction port 214 needs to be secured at a predetermined interval or more. This is because if the distance between the outer circumferential edge of the suction valve 240 and the outer part of the suction port 214 is too close, deformation in which the suction valve 240 is suctioned into the suction port 214 may occur during the compression stroke.

Therefore, it is possible to increase the diameter (outer diameter) of the suction port 214 as the diameter of the suction valve 240 increases. As the diameter (outer diameter) of the suction port 214 increases, the area of the opening hole 244 of the suction valve 240 may also increase. In other words, as the diameter of the suction valve 240 increases, the inner diameter (the outer diameter of the suction port 214) of the outer body 212-1 may increase.

Figure 14:
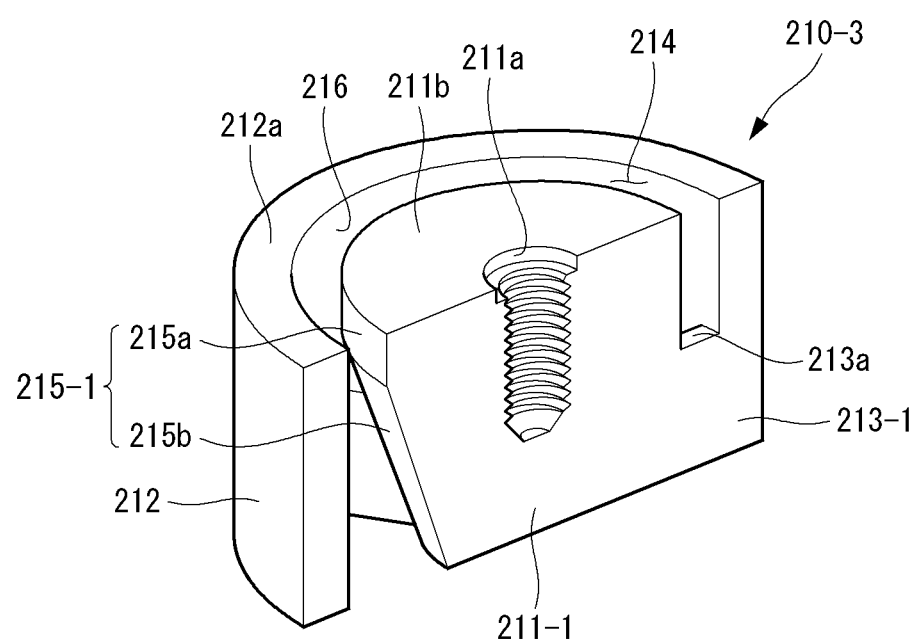
FIG. 14 is a cut-away perspective view illustrating the head according to another embodiment of the present disclosure corresponding to FIG. 5.
Figure 15:
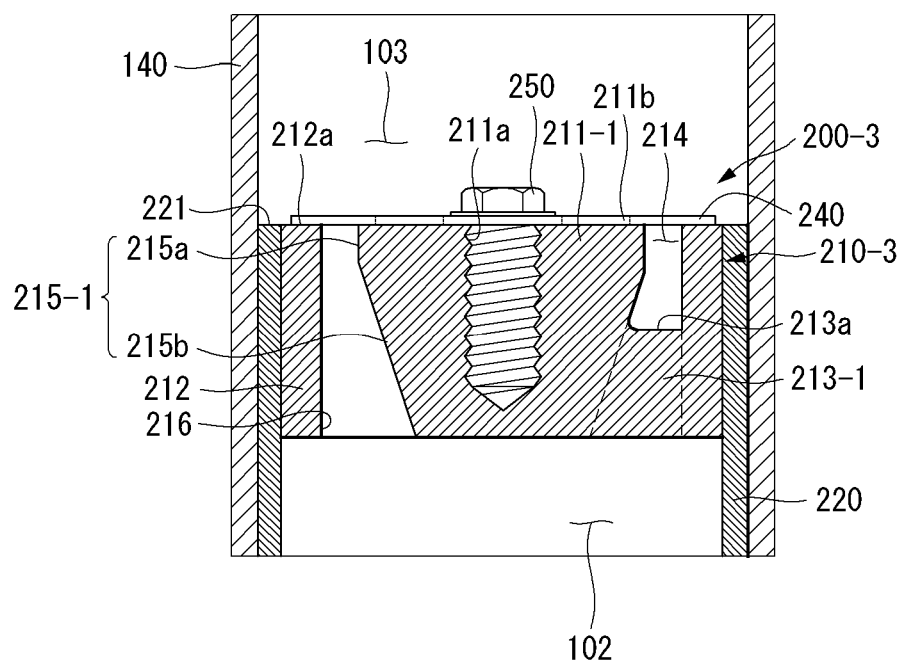
FIG. 15 is a cross-sectional view illustrating a state where a suction valve is closed in a piston according to another embodiment of the present disclosure.

FIG. 14 is a cut-away perspective view illustrating the head 210-3 according to another embodiment of the present disclosure corresponding to FIG. 5, and FIG. 15 is a cross-sectional view illustrating a state where a suction valve 240 is closed in a piston 200-3 according to another embodiment of the present disclosure.

The piston 200-3 according to another embodiment of the present disclosure may reduce flow path resistance of the refrigerant by changing the shape of the suction port 214.

Referring to FIGS. 14 and 15, the inner body 211-1 of the head 210-3 according to another embodiment of the present disclosure may be formed to have a smaller diameter toward the rear.

The outer circumferential surface 215-1 of the inner body 211-1 may include an inclined surface 215b.

As an example, the outer circumferential surface 215-1 of the inner body 211-1 may include a first outer circumferential surface 215a having the same diameter and a second outer circumferential surface 215b located at the rear of the first outer circumferential surface 215a and having a diameter which decreases toward the rear.

The second outer circumferential surface 215b may be defined as an inclined surface of the inner body 211-1.

The inner body 211-1 having the first outer circumferential surface 215a is provided in a cylindrical shape, and the inner body 211-1 having the second outer circumferential surface 215b has a partial shape of a cone (a conical shape with the horn cut off).

Due to the shape of the inner body 211-1, the suction port 214 has a constant cross-sectional area at a position corresponding to the first outer circumferential surface 215a and has a cross-sectional area which may be wide toward the rear at a position corresponding to the second outer circumferential surface 215b.

In other words, the suction port 214 includes an inclined surface 215b such that the cross-sectional area of the flow path is widened in a direction in which the refrigerant flows (on the side of the suction space 102), thereby reducing flow path resistance. When comparing FIGS. 8 and 15, it can be seen that the opening of the inlet region of the suction port 214 is larger in FIG. 15. In other words, when the refrigerant flows from the suction space 102 to the suction port 214, the inlet resistance may decrease.

The flow path resistance is proportional to the pressure loss, and in the above [Calculation Equation 1], it has been confirmed that the pressure loss decreases as the flow path diameter increases. Accordingly, as the inlet cross-sectional area of the suction port 214 increases, the flow path resistance decreases when the refrigerant flows from the suction space 102 to the suction port 214.

In addition, as the refrigerant passes through the suction port 214, the cross-sectional area of the flow path gradually decreases, thereby increasing the flow rate. As the flow rate increases, the kinetic energy of the fluid increases, and thus the amount of deformation of the suction valve 240 may be increased, thereby increasing the flow rate of the refrigerant discharged per hour.

The bridge 213-1 of the head 210-3 according to another embodiment of the present disclosure is provided to increase in width along the inclined surface 215b of the suction port 214. Referring to the cross-sectional view of FIG. 15, the bridge 213-1 may be provided to have a trapezoidal cross-section.

The front end 213a of the bridge 213-1 may be formed to extend from the inclined surface 215b. In other words, the bridge 213-1 may be provided to connect the inclined surface 215b of the inner body 211-1 and the inner circumferential surface 216 of the outer body 212.

Figure 16:
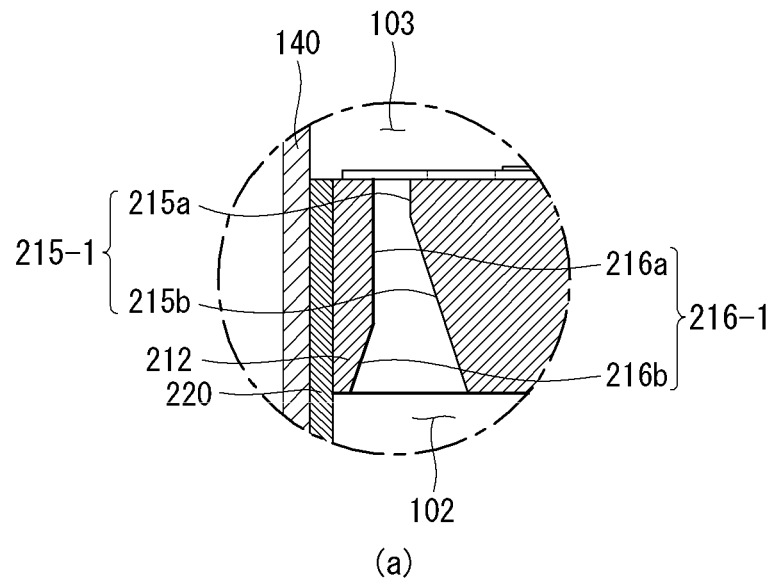
FIG. 16 is an enlarged view illustrating a cross-section of an inner body provided in various forms.
Figure 16:
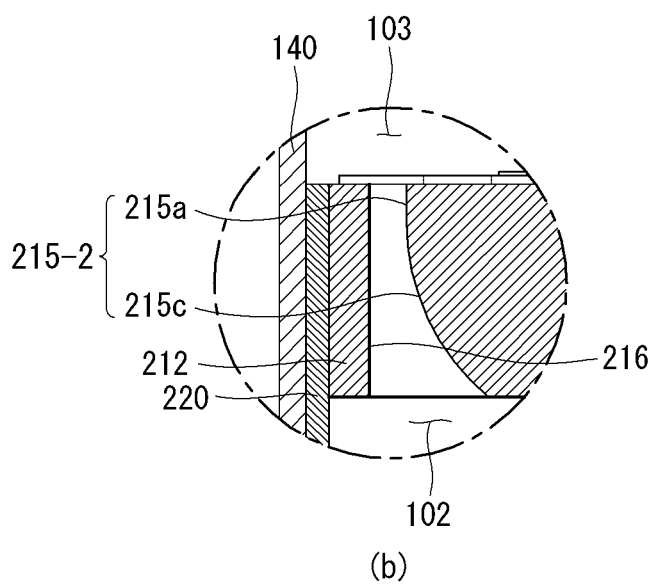

FIG. 16 is an enlarged view illustrating cross-sections of an inner body 211 and an outer body 212 provided in various forms.

Referring to FIG. 16(a), not only the outer circumferential surface 215-1 of the inner body 211 but the inner circumferential surface 216-1 of the outer body 212 may include an inclined surface 216b. If the inclined surface 216b is also formed on the inner circumferential surface 216-1 of the outer body 212, the cross-sectional area of the inlet of the suction port 214 becomes larger, and while the interval between the rear surface of the outer body 212 and the inner wall of the cylinder 140 is narrowed, the fluid resistance at the inlet of the suction port 214 can be reduced.

The inner circumferential surface 216-1 of the outer body 212 may include a first inner circumferential surface 216a having the same diameter, and a second inner circumferential surface 216b located at the rear of the first inner circumferential surface 216a and having a diameter which increases toward the rear.

The second inner circumferential surface 216b may be defined as an inclined surface of the outer body 212.

At this time, the length of the first inner circumferential surface 216a in the axial direction may be formed longer than the length of the second inner circumferential surface 216b in the axial direction, and the length of the first outer circumferential surface 215a of the inner body 211-1 in the axial direction may be formed to be shorter than the length of the second outer circumferential surface 215b in the axial direction.

In other words, a point at which the second inner circumferential surface 216b of the outer body 212 starts may be located rear a point at which the second outer circumferential surface 215b of the inner body 211-1 starts.

For example, the inclined surface 216b formed on the inner circumferential surface 216-1 of the outer body 212 may have a chamfer shape.

Referring to FIG. 16(b), the outer circumferential surface 215-2 of the inner body 211 may include a curved surface 215c in the moving direction of the fluid.

For example, the outer circumferential surface 215-2 of the inner body 211 may be provided in a curved shape convex in the moving direction of the fluid. When the outer circumferential surface 215-2 of the inner body 211 is formed as a curved surface 215c, the cross-sectional area of the inlet of the suction port 214 may increase, and when the refrigerant passes the outer circumferential surface 215-2 of the inner body 211, the frictional resistance can decrease.

The outer circumferential surface 215-2 of the inner body 211 may form a curved surface 215c such that the radius of curvature becomes larger in a direction in which the fluid moves. Like this, by forming in a streamlined shape, the effect of reducing fluid resistance can be maximized.

The front end 213a of the bridge 213-1 may be formed to extend from the curved surface 215c.

In this case, the inner circumferential surface 216 of the outer body 212 may have the same inner diameter as illustrated in FIG. 16(b), but may have an inclined surface 216b or a curved surface as illustrated in FIG. 16(a).

Figure 17:
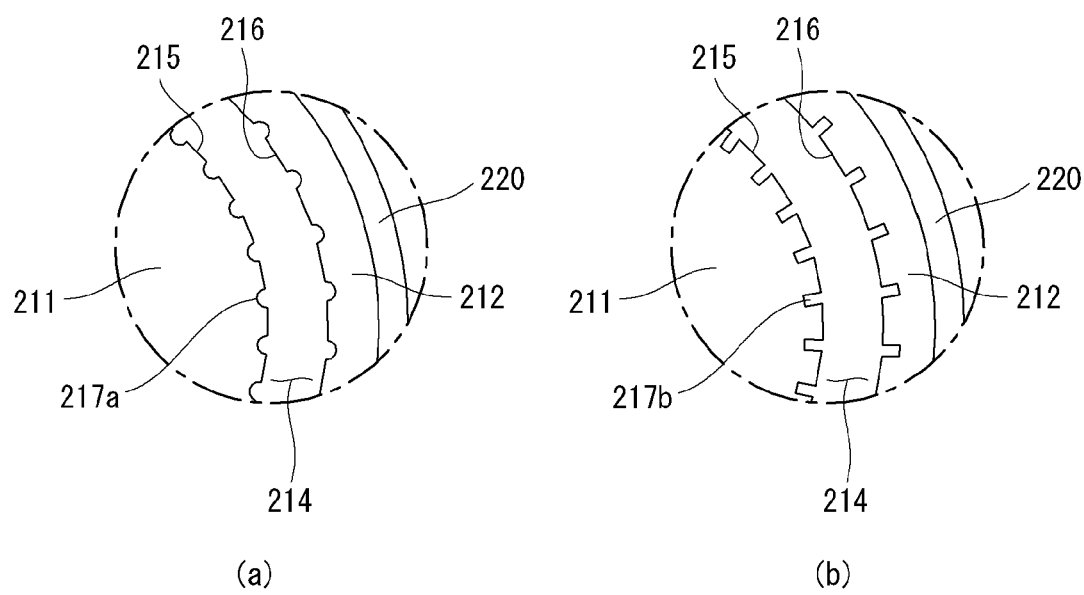
FIG. 17 is an enlarged view illustrating the surfaces of the inner body and the outer body provided in various forms.

FIG. 17 is an enlarged view illustrating the surfaces of the inner body 211 and the outer body 212 provided in various forms.

Referring to FIG. 17(a), fine grooves 217a may be formed in the outer circumferential surface 215 of the inner body 211 and the inner circumferential surface 216 of the outer body 212.

The shape of the fine grooves 217a may be provided in various ways, and, for example, the fine grooves 217a having a partial shape of a concave sphere such as a golf ball may be formed.

In other words, the cross-sectional area of the fine grooves 217a may be formed in a semicircular shape.

The fine grooves 217a of the inner body 211 and the fine slits 217b of the outer body 212 may be formed to be spaced apart from each other in a circumferential direction, respectively.

Referring to FIG. 17(b), fine slits 217b may be formed on the outer circumferential surface 215 of the inner body 211 and the inner circumferential surface 216 of the outer body 212. The fine slits 217b may be formed to extend in the flow direction of the refrigerant.

The fine slits 217b of the inner body 211 may be provided in a shape of a groove recessed inward from the outer circumferential surface 215 of the inner body 211 in the radial direction, and the fine slits 217b of the outer body 212 may be provided in a shape of a groove recessed outward from the inner circumferential surface 216 of the outer body 212 in the radial direction, respectively.

The fine slits 217b of the inner body 211 and the fine slits 217b of the outer body 212 may be formed to be spaced apart from each other in a circumferential direction.

By forming the fine grooves 217a or fine slits 217b in the flow path of the suction port 214, a fine vortex can be formed near the flow path wall, and the frictional resistance with the flow path wall can be reduced due to this fine vortex.

Figure 18:
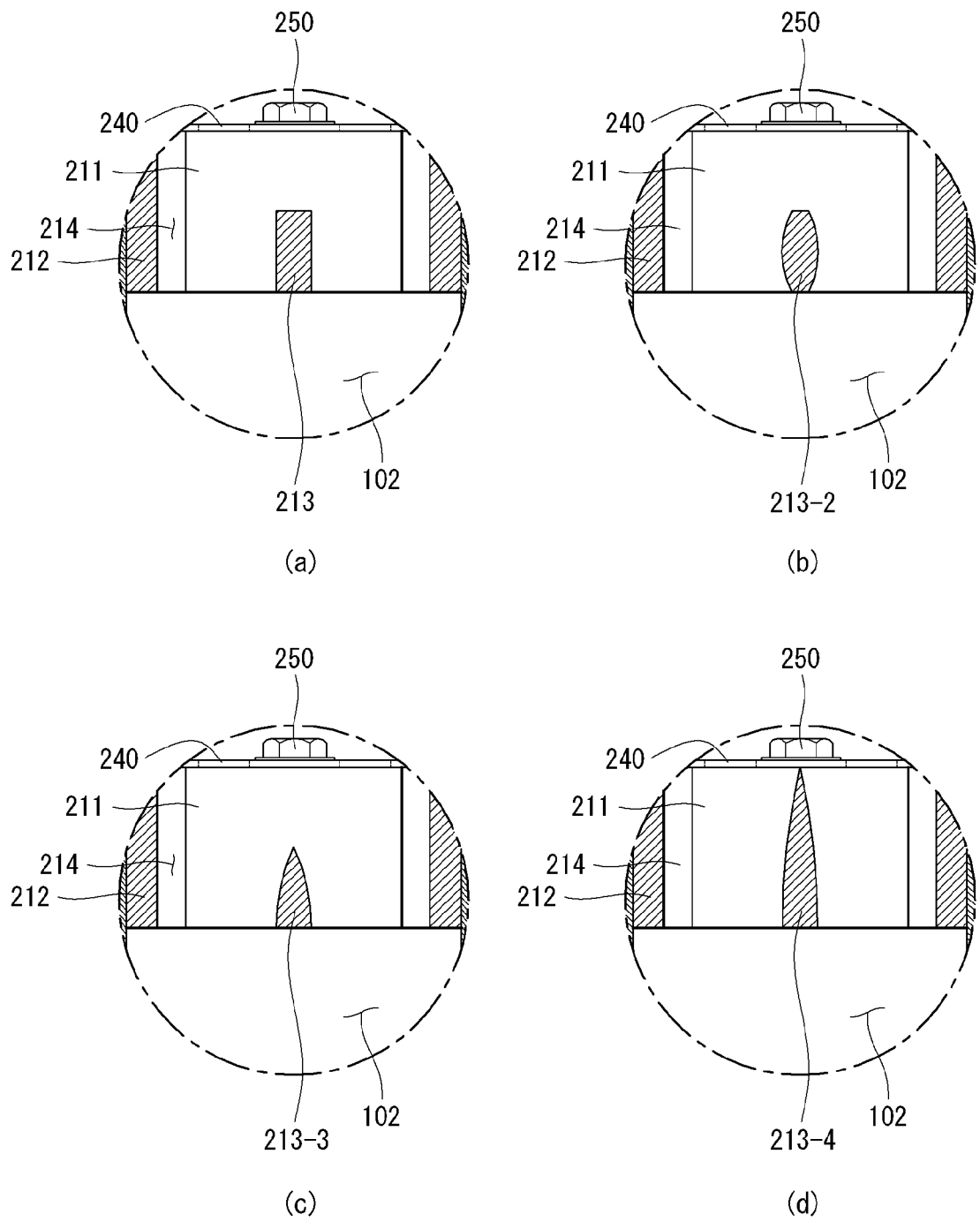
FIG. 18 is an enlarged view illustrating a cross-section of a bridge provided in various forms.

FIG. 18 is an enlarged view illustrating a cross-section of a bridge 213 provided in various forms.

FIG. 18 illustrates a state of being cut between the inner body 211 and the outer body 212 in a plane parallel to the central axis and perpendicular to the radial direction at a position separated from the central axis by a predetermined distance.

FIG. 18(a) illustrates a cut-away view of the bridge 213 illustrated in FIG. 8, and the bridge 213 of FIG. 8 has a rectangular cross-section in consideration of convenience in manufacturing.

Referring to FIG. 18(b), both side surfaces of the bridge 213-2 may include curved surfaces in the moving direction of the fluid.

For example, both side surfaces of the bridge 213-2 may be provided in a curved shape convex in the moving direction of the fluid. In detail, both side surfaces of the bridge 213-2 may be curved surfaces formed to be convex in a direction toward the suction port 214.

When the side surface of the bridge 213-2 is formed in a curved surface, eddy currents generated when the refrigerant passes through the bridge 213-2 can be reduced. In front of the bridge 213-2, the refrigerant on both side surfaces of the bridge 213-2 can form a uniform flow.

Referring to FIG. 18 (c), both side surfaces of the bridge 213-3 may include curved surfaces in a moving direction of the fluid but may form curved surfaces such that the radius of curvature increases in the moving direction of the fluid.

In other words, it is possible to form a curved surface having a gentle curvature in the moving direction of the fluid. Through this shape, the effect of forming a uniform flow of the refrigerant on both side surfaces of the bridge 213-3 in front of the bridge 213-3 can be maximized.

At this time, in front of the bridge 213-3, the curved surfaces of both side surfaces may converge so that the curved surfaces of both side surfaces meet.

Referring to FIG. 18(d), the length of the bridge 213-4 may extend to the front end surface (compression surface) of the head 210 on which the suction valve 240 is seated. In other words, the front end part of the bridge 213-4 may be located on the same plane as the front end part of the head 210.

When both side surfaces of the bridges 213-3 and 213-4 form a curved surface with a larger radius of curvature in the moving direction of the fluid as illustrated in FIGS. 18(c) and (d), at the outlet side of the bridges 213-3 and 213-4, the refrigerant on both side surfaces of the bridges 213-3 and 213-4 may form a uniform flow. Accordingly, the bridge 213-4 can extend to the front end part of the head 210 as illustrated in FIG. 18(d).

When the bridge 213-4 extends to the front end part of the head 210, the strength of the bridge 213-4 may increase, and the inner body 211 and the outer body 212 may be supported more firmly.

Figure 19:
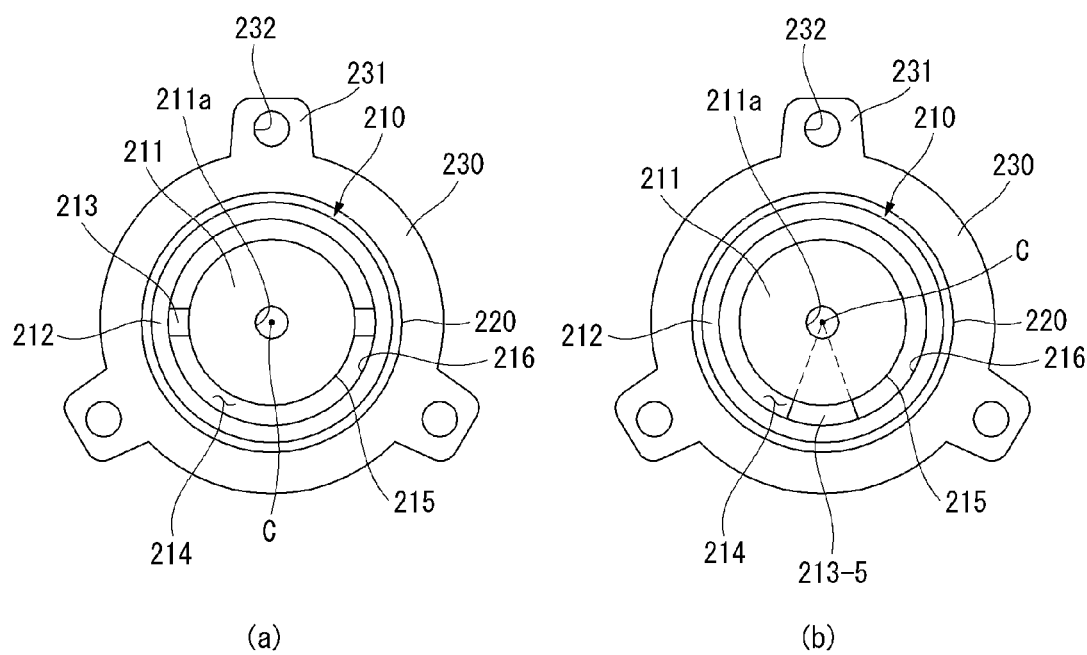
FIG. 19 is a view illustrating an increase in the area of a suction port by varying the number of bridges.

FIG. 19 is a view illustrating an increase in the area of a suction port by varying the number of bridges 213.

Referring to FIG. 19(a), two bridges 213 may be provided at an interval of 180 degrees. The virtual line extending the two bridges 213 may pass through the central axis C.

When disposing the bridges 213 in this disposition, equal pressure is applied to each of the bridges 213. In this case, the suction port 214 may form an arc-shaped flow path having an angle of approximately 180 degrees.

Alternatively, referring to FIG. 19(b), a single bridge 213-5 may be provided. In this case, the suction port 214 may form an approximately circular ring-shaped flow path.

As the number of bridges 213-5 decreases, the force applied to one bridge 213-5 increases. Therefore, when the number of bridges 213-5 decreases, the width of the bridges 213-5 can increases.

When the bridge 213-5 is viewed from the front, both side surfaces of the bridge 213-5 may be provided in a direction extending from the central axis C in a radial direction. When the bridge 213-5 is provided in such a shape, the durability of the bridge 213-5 may be improved.

The number, width, or the like of the bridges 213 may be determined according to the rigidity required for the head 210. The number or width of the bridges 213 may vary depending on requirements, such as specifications of the compressor. As the number or width of the bridges 213 increases, the rigidity of the head 210 increases, but the flow path resistance of the suction port 214 increases. Conversely, as the number or width of the bridges 213 decreases, the rigidity of the head 210 decreases, but the flow path resistance of the suction port 214 decreases.

Figure 20:
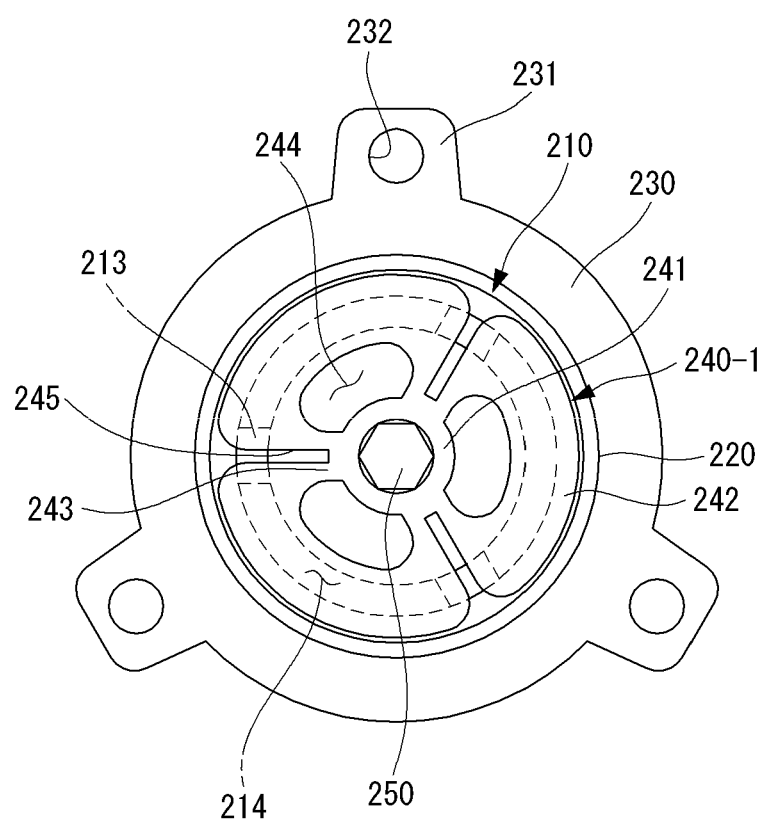
FIG. 20 is a plan view illustrating a state where a suction valve according to another embodiment is mounted in FIG. 6.
Figure 21:
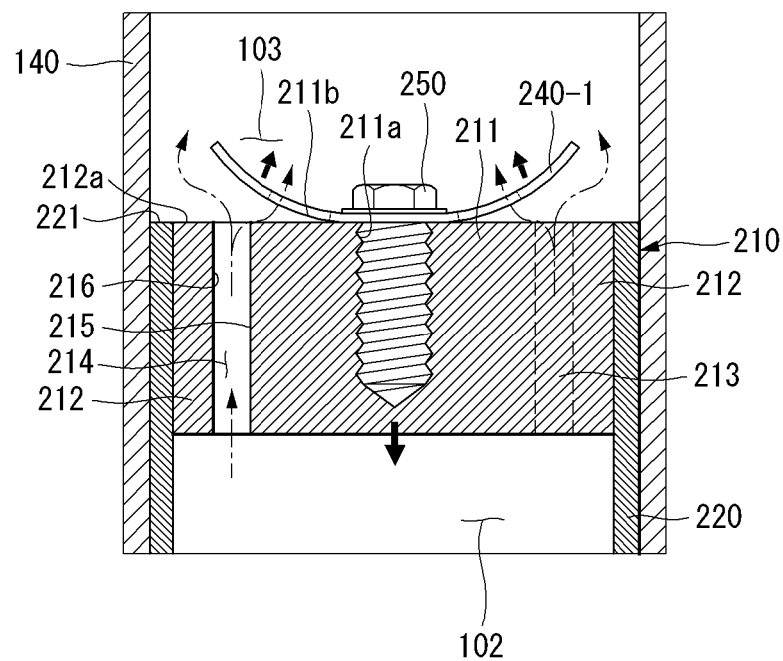
FIG. 21 is a cross-sectional view illustrating a state where the suction valve is opened in FIG. 20.

FIG. 20 is a plan view illustrating a state where a suction valve 240-1 according to another embodiment is mounted in FIG. 6, and FIG. 21 is a cross-sectional view illustrating a state where the suction valve 240-1 is opened in FIG. 20.

The suction valve 240 illustrated in FIG. 6 and the suction valve 240-1 according to another embodiment may include a cutting part 245 capable of facilitating the deformation of the wing part 242.

Referring to FIG. 20, in the suction valve 240-1, three cutting parts 245 may be formed at an interval of 120 degrees radially from the center. Therefore, the suction valve 240-1 may include three wing parts 242 which can be independently deformed based on the center.

By forming the cutting part 245 in this way, the wing part 242 can be easily unfolded, and the angle at which the wing part 242 is unfolded can increase.

Compared with the case where the wing part 242 is integrally formed in the circumferential direction as illustrated in FIG. 6, in a case where a plurality of wing parts 242 that form a cutting part 245 in the radial direction and move independently of each other in the circumferential direction are formed, the wing part 242 may be deformed even with a smaller force. When the wing part 242 is deformed, the angle formed by the wind and the front end part of the head 210 increases, so that the flow rate of the refrigerant discharged through the suction port 214 may increase.

Referring to FIG. 21, in the head 210, the front end part 213a of the bridge 213 may form the same plane as the front end parts 211b and 212a of the inner body 211 and the outer body 212.

The outer part provided in an arc shape of the wing part 242 is supported by the front end part 212a of the outer body 212, and the radial part of the wing part 242 forming the cutting part 245 is supported on the front end part of the bridge 213.

Referring to FIG. 21, the cutting part 245 may extend to be located in front of the bridge 213. In detail, the cutting part 245 may be located at the front end portion 213a of the bridge 213.

In other words, when viewed from the front, at least a part of the bridge 213 is covered by the suction wing part 242, and the suction ports 214 located on both sides of the bridge 213 are completely covered by the wing part 242.

Therefore, in a state where the wing part 242 of the suction valve 240 is closed, the refrigerant may not leak from the suction port 214.

Meanwhile, the opening hole 244 of the suction valve 240 may be formed in the wing part 242 so as to be located inside the suction port 214 in the radial direction.

The opening hole 244 may be formed between two adjacent cutting parts 245. The opening hole 244 and the cutting part 245 may be formed alternately in the circumferential direction.

Therefore, when the three cutting parts 245 are disposed at intervals of 120 degrees, the three opening holes 244 may be disposed at intervals of 120 degrees between the cutting parts 245, respectively. Three suction ports 214 divided by three bridges 213 disposed at intervals of 120 degrees may also be disposed at intervals of 120 degrees between cutting parts 245, respectively.

Figure 22:
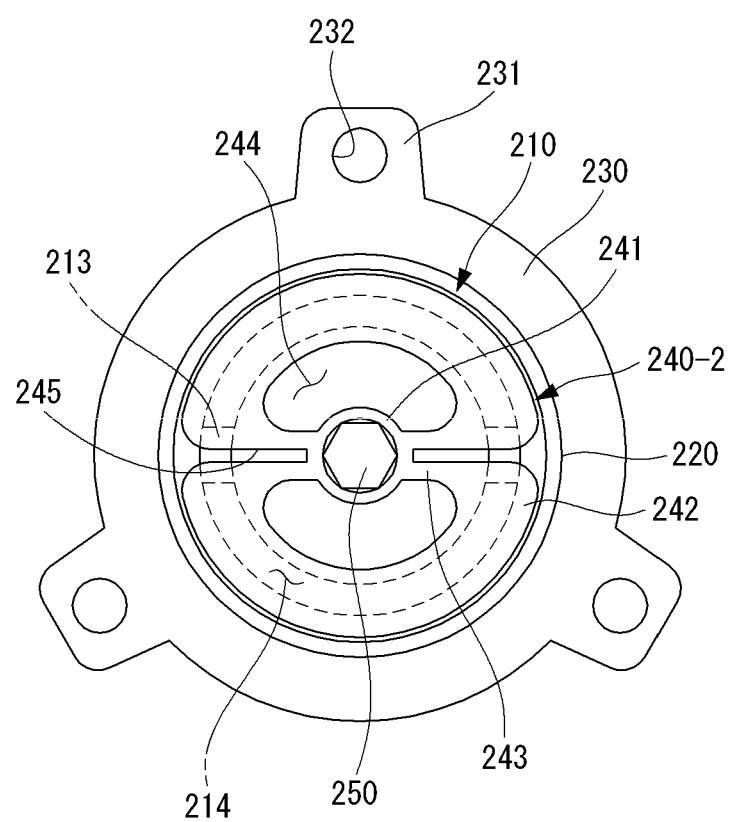
FIG. 22 is a plan view illustrating a state where a suction valve according to another embodiment is mounted in FIG. 20.

FIG. 22 is a plan view illustrating a state where a suction valve 240-2 according to another embodiment is mounted in FIG. 20.

Referring to FIG. 22, in the suction valve 240-2, two cutting parts 245 may be formed at intervals of 180 degrees radially from the center. Accordingly, the suction valve 240-2 may have two wing parts 242 that can be independently deformed based on the center.

The cutting part 245 may be formed to be located in front of the bridge 213. In detail, the cutting part 245 may be disposed to overlap the front end of the bridge 213 so that at least a part of the bridge 213 is covered by the wing part 242.

In other words, when viewed from the front, the suction port 214 is completely covered by the wing part 242. Therefore, in a state where the wing part 242 of the suction valve 240-2 is closed, the refrigerant may not leak from the suction port 214.

Meanwhile, the opening hole 244 of the suction valve 240-2 may be formed between adjacent cutting parts 245.

Therefore, in a case where the two cutting parts 245 are disposed at intervals of 180 degrees, the two opening holes 244 may be disposed at intervals of 180 degrees between cutting parts 245, respectively. In addition, two suction ports 214 divided by two bridges 213 disposed at intervals of 180 degrees may also be disposed at intervals of 180 degrees between cutting parts 245, respectively.

Those described above are merely examples to help to understand the disclosure, and in the piston 200 according to the embodiment of the present disclosure, the shape of the suction port 214, the number of bridges 213, the number of the cutting part 245, or the number of opening holes 244 may be different. For example, the head 210 may have four bridges, and the suction valve 240 may have four cutting parts 245 and four opening holes 244.

Certain or other embodiments of the present disclosure described above are not mutually exclusive or distinct. In certain or other embodiments of the present disclosure described above, their respective configurations or functions may be used together or combined.

For example, it means that configuration A described in a specific embodiment and/or drawing may be combined with configuration B described in another embodiment and/or drawing. In other words, even if the combination between the configurations is not directly described, it means that the combination therebetween is possible except for a case of being described that the combination therebetween is not possible.

The above-detailed description should not be construed as restrictive in all respects and should be considered as illustrative. The scope of the present disclosure should be determined by reasonable interpretation of the appended claims, and all changes within the equivalent scope of the present disclosure are included in the scope of the present disclosure.

The piston for a compressor and the compressor including the same according to the present disclosure can improve the response characteristics of the suction valve and improve the compression efficiency while reducing the diameter of the piston by changing the position and shape of the suction port.

In addition, it is possible to improve the airtightness of the suction valve and prevent damage or generation of particles even after long use.

Further, according to at least one of the embodiments of the present disclosure, the flow path loss may be reduced by including a tapered shape in the flow path of the suction port.

In addition, according to at least one of the embodiments of the present disclosure, it is possible to reduce the flow path loss by changing the shape of the bridge or forming a fine groove or a fine slit in the flow path of the suction port.

In addition, according to at least one of the embodiments of the present disclosure, it is possible to increase the flow rate of the discharged refrigerant by cutting the wing part of the suction valve.

EXPLANATION OF REFERENCE NUMERAL

| | |
|---|---|
| 100: compressor, | 101: receiving space, |
| 102: suction space, | 103: compression space, |
| 104: discharge space, | 110: casing, |
| 111: shell, | 112: first shell cover, |
| 113: second shell cover, | 114: suction pipe, |
| 115: discharge pipe, | 115a: loop pipe, |
| 116: first support spring, | 116a: suction guide, |
| 116b: suction-side support member, | 116c: damping member, |
| 117: second support spring, | 117a: support bracket, |
| 117b: first support guide, | 117c: support cover, |
| 117d: second support guide, | 117e: third support guide, |
| 118: resonance spring, | 118a: first resonance spring, |
| 118b: second resonant spring, | 119: spring supporter, |
| 119a: body part, | 119b: coupling part, |
| 119c: support part, | 120: frame, |
| 121: body part, | 122: flange part, |
| 123: back cover, | 123a: support bracket, |
| 130: drive unit, | 131: outer stator, |
| 132: coil winding body, | 132a: bobbin, |
| 132b: coil, | 133: stator core, |
| 134: inner stator, | 135: mover, |
| 136: magnet frame, | 136a: coupling part, |
| 137: stator cover, | 140: cylinder, |
| 141: flange part, | 142: gas inflow port, |
| 150: piston, | 151: head, |

-continued

EXPLANATION OF REFERENCE NUMERAL

| | |
|---|---|
| 152: guide, | 153: flange part, |
| 154: suction port, | 155: suction valve, |
| 160: muffler unit, | 161: suction muffler, |
| 161a: flange part, | 162: inner guide, |
| 170: discharge valve assembly, | 171: discharge valve, |
| 172: valve spring, | 180: discharge cover assembly, |
| 181: first discharge cover, | 182: second discharge cover, |
| 183: third discharge cover, | |
| 200: piston, | 210: head, |
| 211: inner body, | 211a: coupling hole, |
| 212: outer body, | 212b: cover part, |
| 212c: insert part, | 213: bridge, |
| 214: suction port, | 220: slider, |
| 230: flange part, | 231: coupling part, |
| 232: coupling hole, | 233: insert part, |
| 240: suction valve, | 241: fixing part, |
| 241a: coupling hole, | 242: wing part, |
| 243: connection part, | 244: opening hole, |
| 245: cutting part, | 250: fastening member |

What is claimed is:

1. A piston for a compressor, wherein the compressor includes a cylinder and is configured to compress and discharge a refrigerant in the cylinder, the piston comprising: a cylindrical slider that is received in the cylinder and that defines a suction space configured to receive the refrigerant that is suctioned into the cylinder; and a head that is coupled to the slider and that has a first side and a second side opposite to the first side, wherein a compression space is defined at the first side of the head and the suction space is defined at the second side of the head, wherein the head defines a suction port that fluidly communicates with the suction space and the compression space, wherein the head includes: an inner body disposed within the slider, an outer body surrounding the inner body, and a plurality of bridges that connect the inner body to the outer body and that are spaced apart from each other in a circumferential direction with respect to a center of the inner body, wherein the suction port is defined between the inner body and the outer body, and wherein an end part of the inner body, an end part of the outer body, and an end part of the slider are disposed on a same plane; a suction valve that is coupled to the first side of the head and that is configured to open and close the suction port, wherein, based on the suction valve being seated at the first side of the head, the suction valve extends radially and has an outer periphery that is positioned between (i) a first surface that includes an outer circumferential surface of the outer body and (ii) a second surface that includes an inner circumferential surface of the outer body.

2. The piston of claim 1, wherein the inner body is disposed within the outer body.

3. The piston of claim 1, wherein the suction port is spaced apart from an inner circumferential surface of the slider.

4. The piston of claim 1, wherein the outer body of the head includes: an insert part that is inserted into the slider, and a cover part that extends radially from the insert part and that faces an end of the slider.

5. The piston of claim 4, wherein the cover part is seated at the end of the slider, and wherein an outer diameter of the cover part is the same as an outer diameter of the slider, or is smaller than the outer diameter of the slider and greater than an inner diameter of the slider.

6. The piston of claim 1,
wherein an outer circumferential surface of the inner body of the head includes a first inclined surface or a first curved surface that decreases an outer diameter of the inner body in a direction toward the suction space.

7. The piston of claim 6,
wherein the outer circumferential surface of the inner body of the head includes:
- a first outer circumferential surface that has a consistent diameter in an axial direction, and
- a second outer circumferential surface that extends from the first outer circumferential surface, and that has a diameter that decreases toward the second side of the head, wherein the second outer circumferential surface includes the first inclined surface or the first curved surface, and wherein the first outer circumferential surface is located closer to the compression space than the suction space, and wherein the second outer circumferential surface is located closer to the suction space than the compression space.

8. The piston of claim 6, wherein each of the plurality of bridges extend from the first inclined surface or the first curved surface.

9. The piston of claim 6,
wherein an inner circumferential surface of the outer body of the head includes a second inclined surface or a second curved surface that increases an inner diameter of the outer body in the direction toward the suction space.

10. The piston of claim 1,
wherein an outer circumferential surface of the inner body of the head includes an outer diameter of the inner body that decreases in a direction toward the suction space, and wherein the outer circumferential surface of the inner body of the head includes a curved surface that has a radius of curvature that decreases toward the suction space.

11. The piston of claim 1,
wherein a fine groove is defined at at least one of an inner circumferential surface of the inner body of the head or an outer circumferential surface of the outer body of the head.

12. The piston of claim 11,
wherein the fine groove includes a shape of a partial concave sphere.

13. The piston of claim 11,
wherein the fine groove includes a slit shape that extends in a flow direction of the refrigerant.

14. The piston of claim 1, wherein a side surface of each of the plurality of bridges includes a convex surface in a direction toward the suction port.

15. The piston of claim 14, wherein the side surface of each of the plurality of bridges includes a curved surface that has a radius of curvature that increases in a flow direction of the refrigerant.

16. The piston of claim 1, wherein an end part of the bridge extends toward the end part of the inner body.

17. The piston of claim 2, wherein the suction valve includes: a fixing part that is fixed to the inner body of the head, a plurality of wing parts that surround the fixing part and that are configured to flex based on flowing of the refrigerant that is discharged from the suction port, and a plurality of cutting parts that extend in a radial direction from an outer circumferential edge of the plurality of wing parts, and wherein the plurality of cutting parts overlap with the plurality of bridges, respectively, and wherein the suction port is defined at opposite sides of each of the plurality of bridges, and is closed by the wing parts based on the suction valve closing the suction port.

18. A compressor comprising: a cylinder; a piston comprising: a cylindrical slider that is received in the cylinder and that defines a suction space configured to receive a refrigerant that is suctioned in the cylinder, and a head that is coupled to the slider and that has a first side and a second side opposite to the first side, wherein a compression space is defined at the first side of the head and the suction space is defined at the second side of the head, wherein the head defines a suction port that fluidly communicates with the suction space and the compression space, wherein the head includes: an inner body disposed within the slider, an outer body surrounding the inner body, and a plurality of bridges that connect the inner body to the outer body and that are spaced apart from each other in a circumferential direction with respect to a center of the inner body, wherein the suction port is defined between the inner body and the outer body; and a discharge valve configured to selectively open and close an opening of the cylinder, wherein an end part of the inner body, an end part of the outer body, and an end part of the slider are disposed on a same plane; a suction valve that is coupled to the first side of the head and that is configured to open and close the suction port, wherein, based on the suction valve being seated at the first side of the head, the suction valve extends radially and has an outer periphery that is positioned between (i) a first surface that includes an outer circumferential surface of the outer body and (ii) a second surface that includes an inner circumferential surface of the outer body.

* * * * *